United States Patent [19]
Folsom et al.

[11] Patent Number: 5,956,953
[45] Date of Patent: Sep. 28, 1999

[54] CONCENTRIC RADIAL PISTON TRANSMISSION WITH FLEXIBLE CAM RING

[76] Inventors: Lawrence R. Folsom; Clive Tucker, both of 66 West St., Pittsfield, Mass. 01210

[21] Appl. No.: 09/023,653

[22] Filed: Feb. 8, 1998

Related U.S. Application Data

[60] Provisional application No. 60/037,566, Feb. 8, 1997.

[51] Int. Cl.⁶ ..................................................... F16D 39/00
[52] U.S. Cl. ................................................ 60/491; 60/487
[58] Field of Search .............................. 60/490, 491, 492, 60/487

[56] References Cited

U.S. PATENT DOCUMENTS

| | | | |
|---|---|---|---|
| 1,924,017 | 8/1933 | Bedford | ..................................... 60/491 |
| 1,988,213 | 1/1935 | Ott . | |
| 2,673,448 | 3/1954 | Wheeler | ................................ 60/491 X |
| 3,137,235 | 6/1964 | Brown . | |
| 3,654,761 | 4/1972 | Eickmann . | |
| 3,898,021 | 8/1975 | Barneoud-Arnoulet | ................... 418/31 |
| 4,109,466 | 8/1978 | Keech | ..................................... 60/491 X |
| 4,495,768 | 1/1985 | Valavaara . | |

*Primary Examiner*—John E. Ryznic
*Attorney, Agent, or Firm*—J. Michael Neary

[57] ABSTRACT

An infinitely variable hydrostatic transmission includes a radial piston pump having outwardly opening pump cylinders containing radial pump pistons, and a radial piston motor, arranged concentrically around the pump, having inwardly opening motor cylinders containing radial motor pistons. Fluid passages in the transmission intermittently connect the pump cylinders and the motor cylinders in a closed fluid flow circuit. A flexible cam ring is radially interposed between the pump and the motor in load bearing relation to the pump pistons on an inside surface of the cam ring, and in load bearing relation to the motor pistons on an outside surface of the cam ring. An input shaft is coupled in torque driving relation to the pump, and an output shaft is coupled in torque driven relation through a commutator plate to the cam ring. An adjustment mechanism is provided for adjusting the cam ring to a desired radial profile to set the transmission to a desired transmission ratio. A fluid distribution system has passages, including kidney shaped slots through the comutator plate, for fluid flow of fluid pressurized in the pump cylinders to the motor cylinders during a power stroke of the pump and motor pistons, and for fluid flow of spent fluid from the motor cylinders to the pump cylinders during a suction phase of the stroke of the pump and motor pistons. A control system adjusts the profile of the cam ring to control the transmission ratio, and a pressure compensator automatically reduces the transmission ratio when the resistance torque on the output shaft exceeds a predetermined value, as when the vehicle is ascending a steep hill.

20 Claims, 34 Drawing Sheets

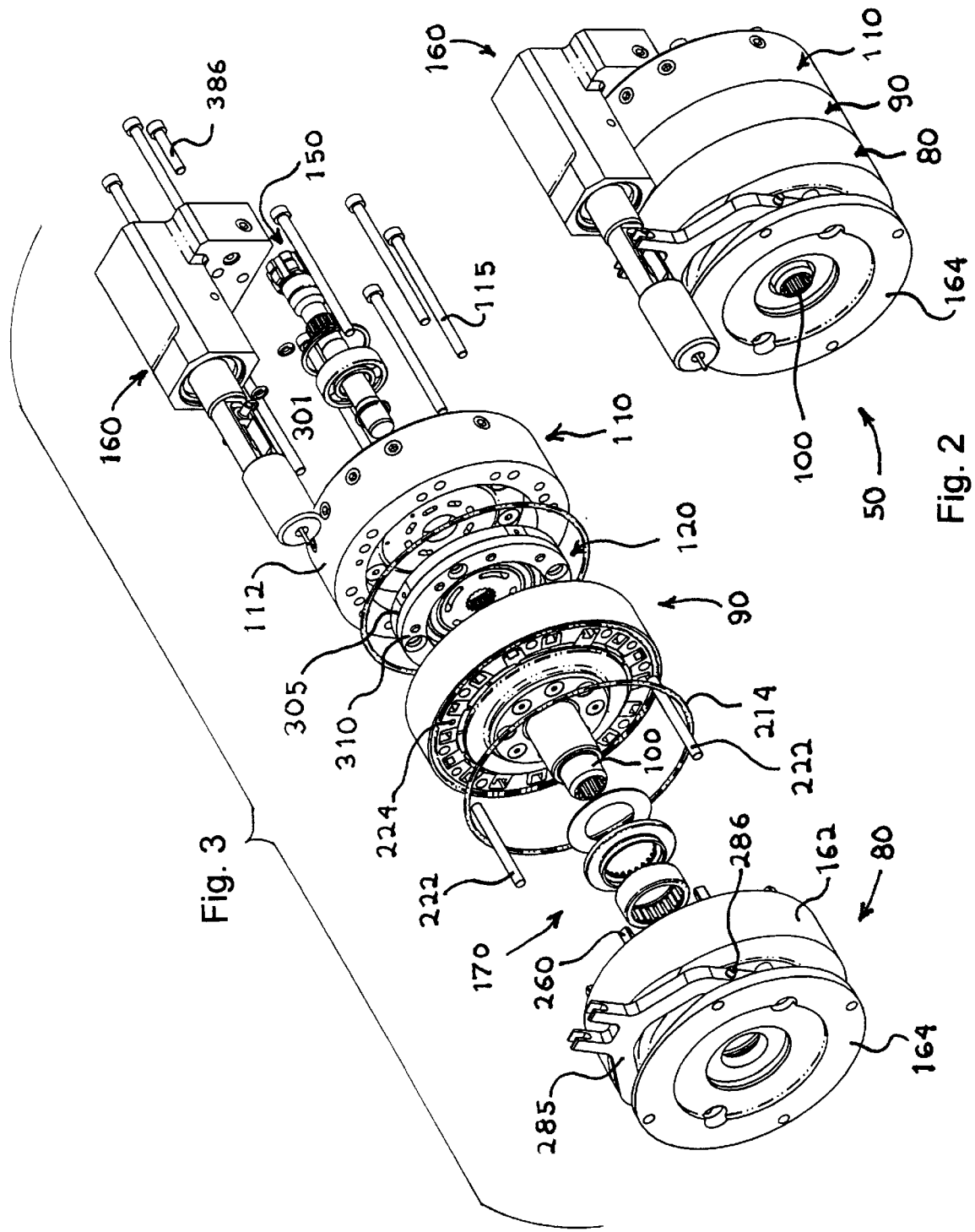

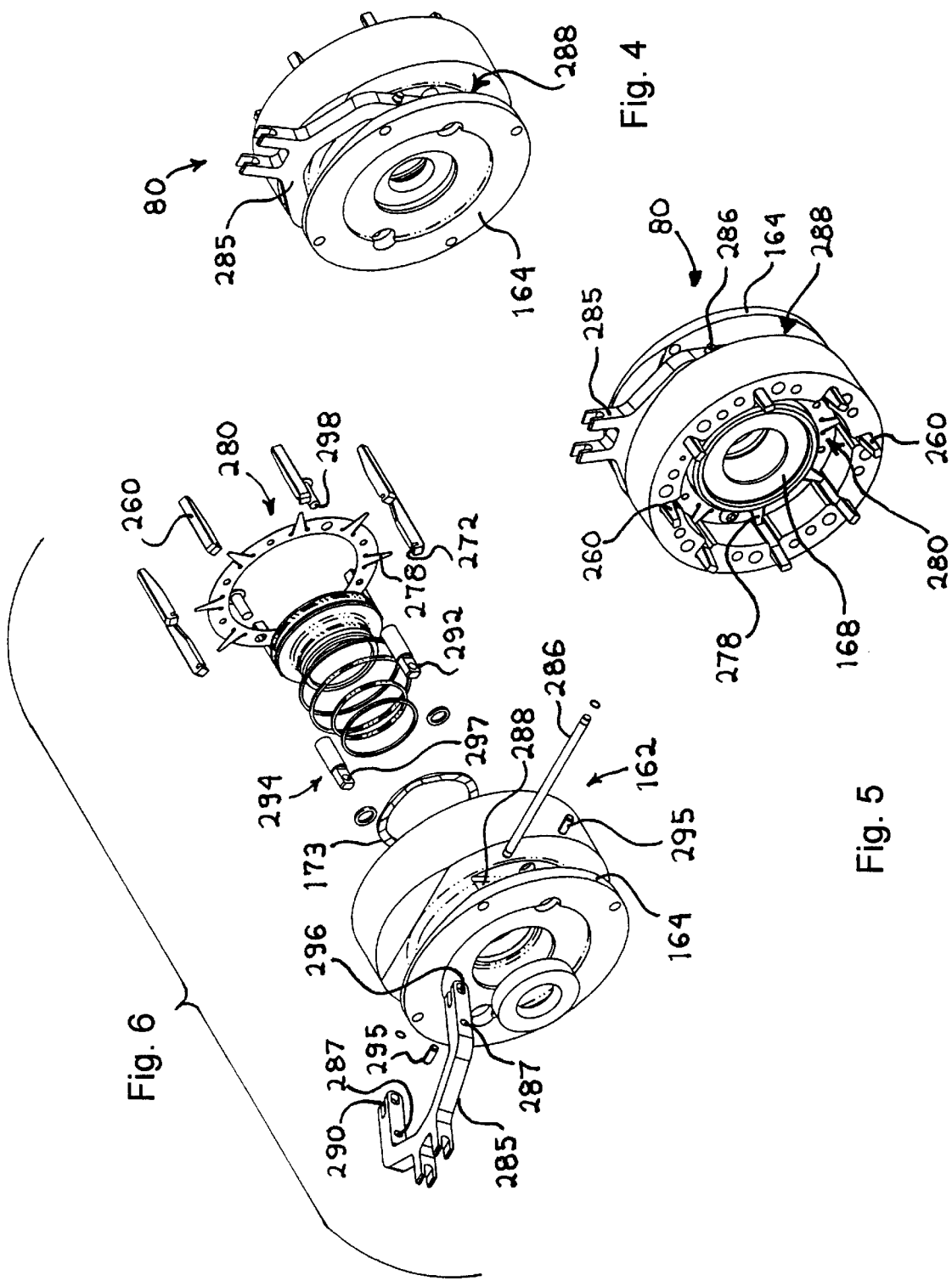

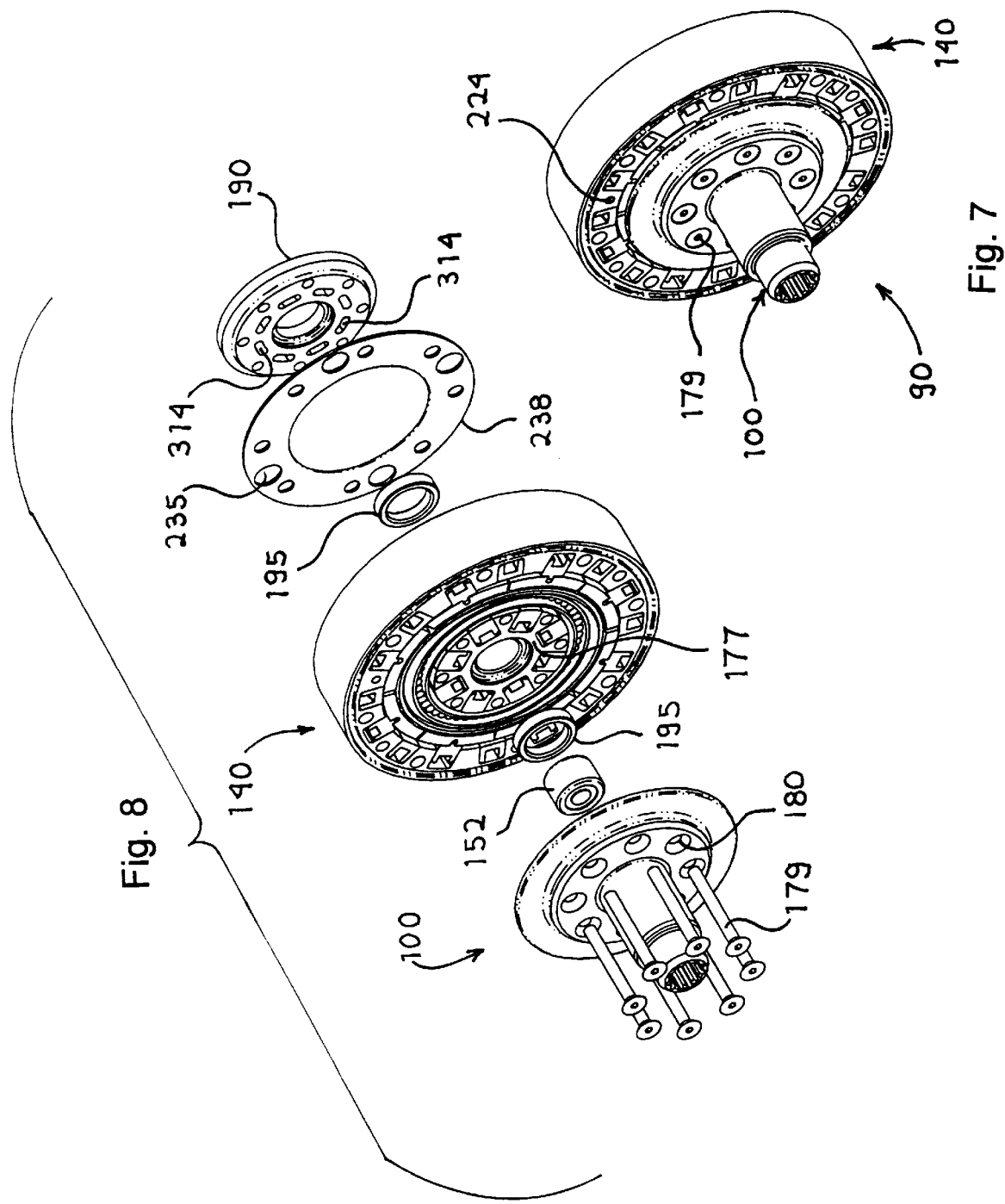

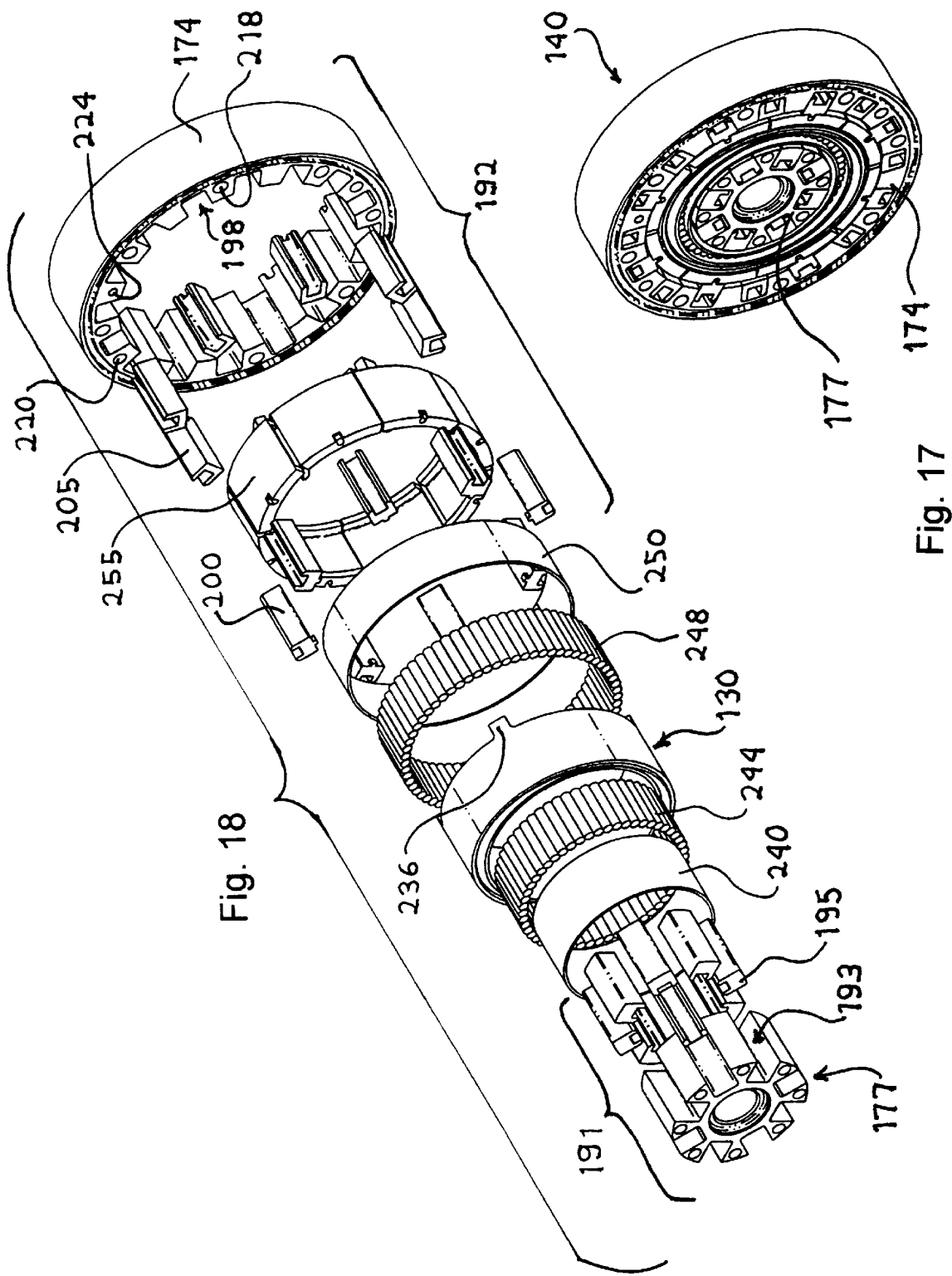

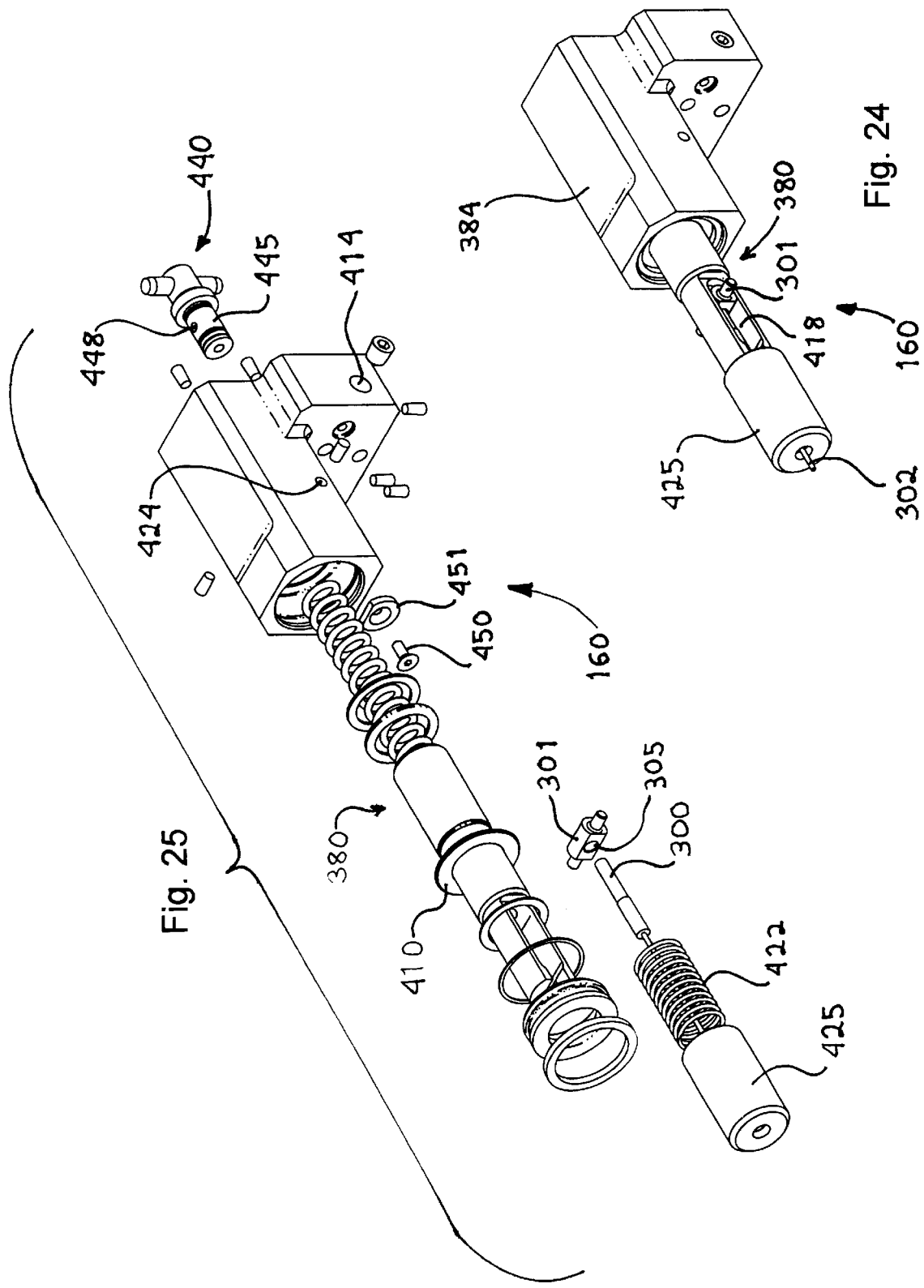

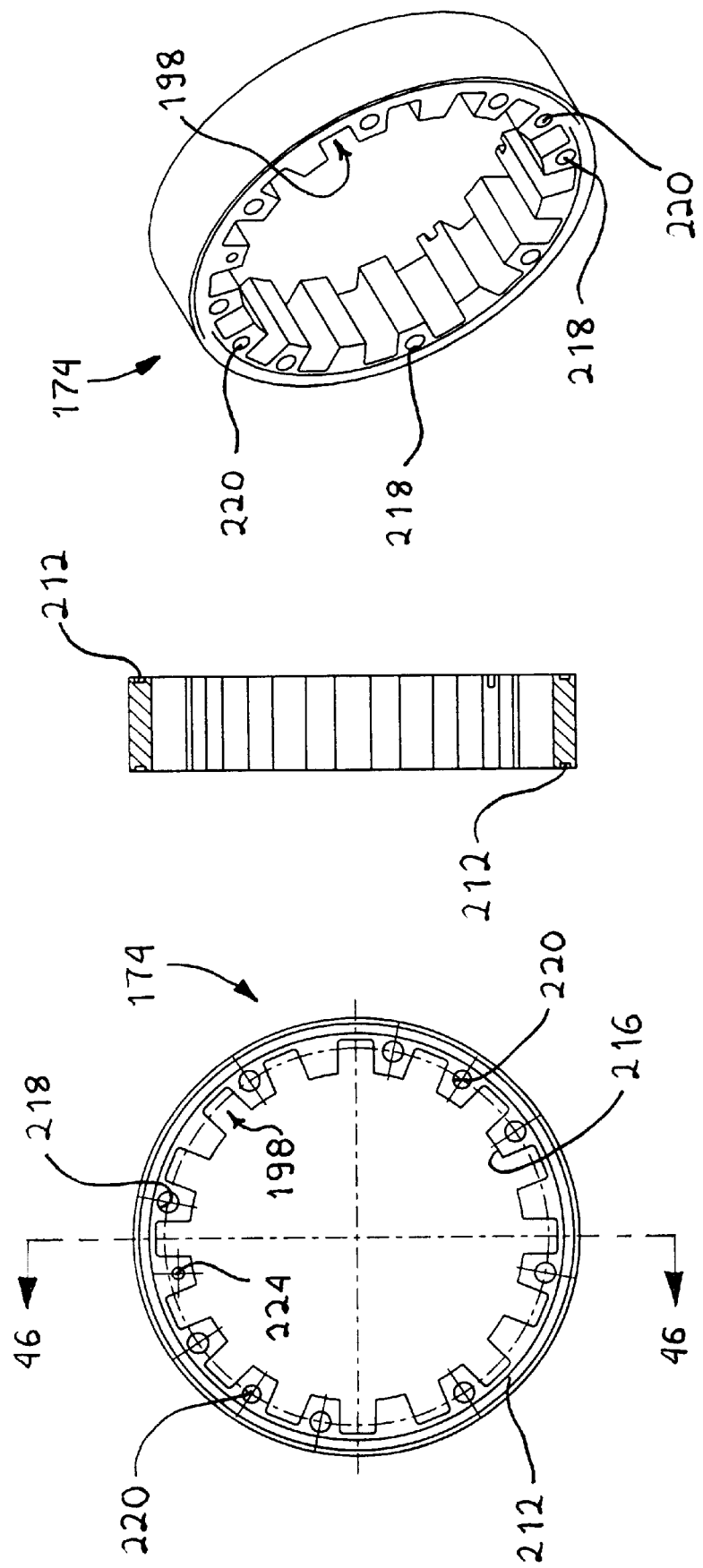

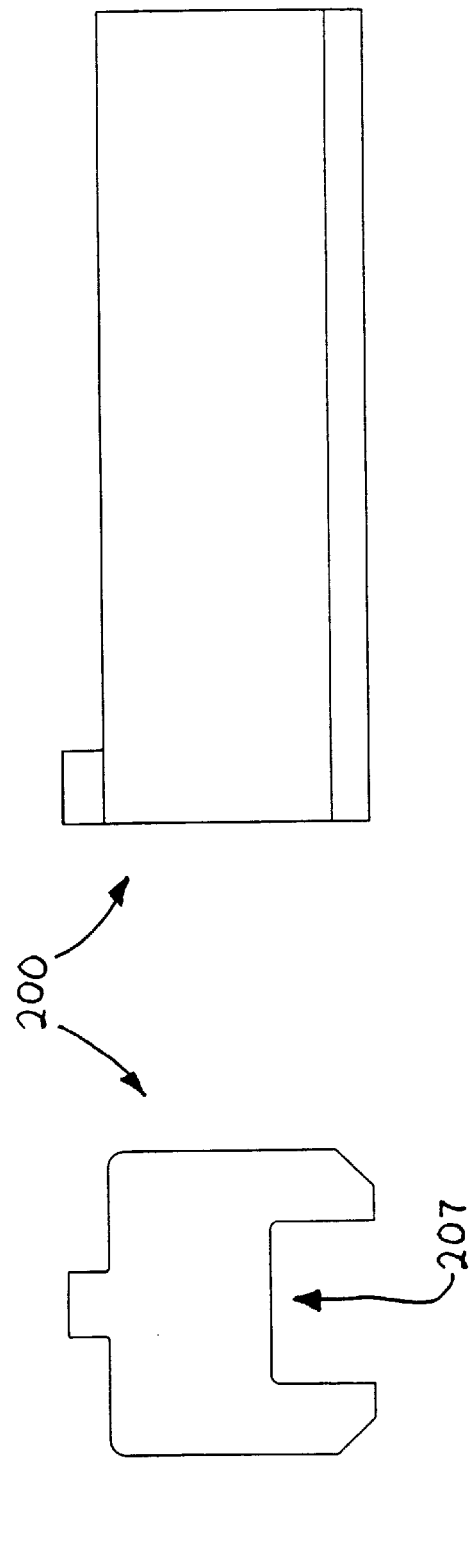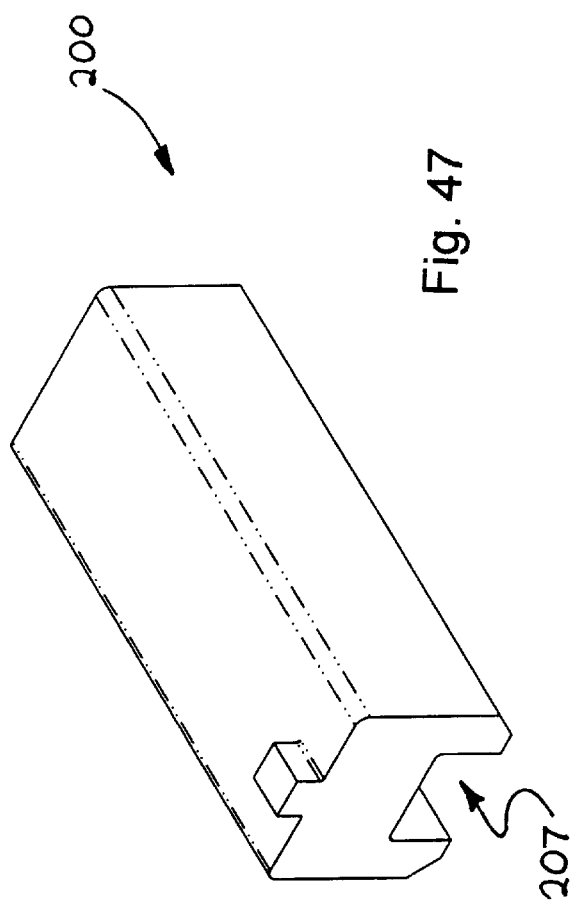

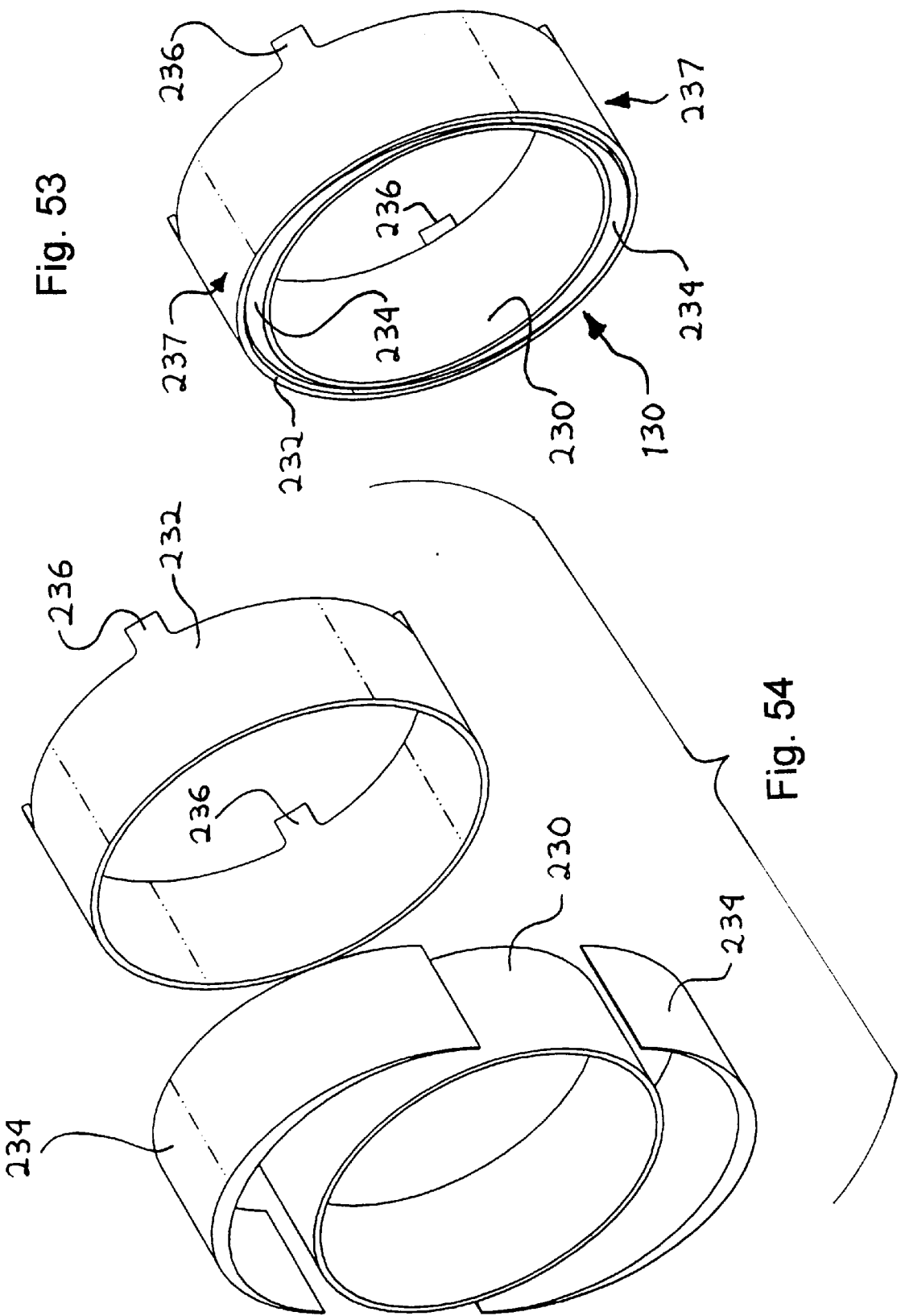

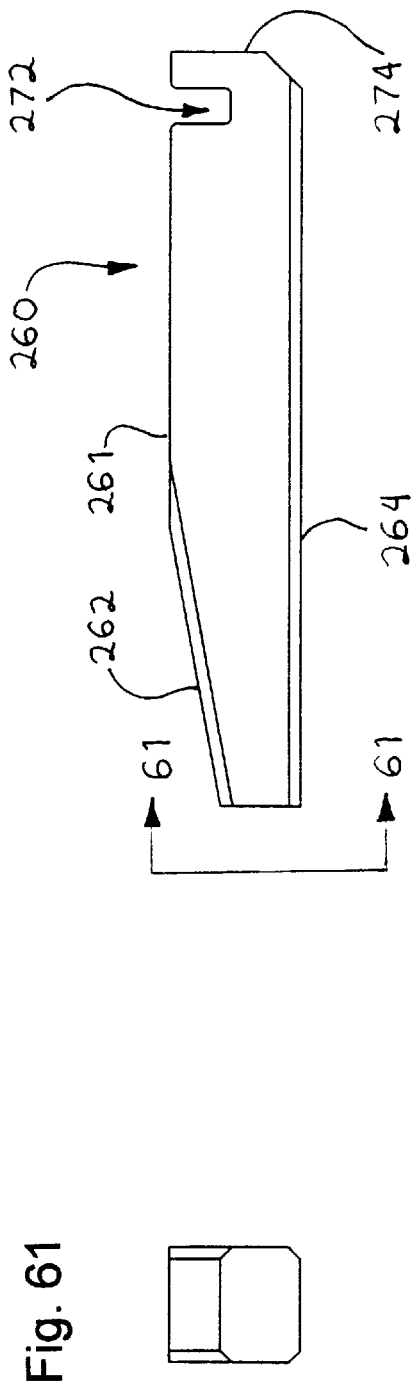
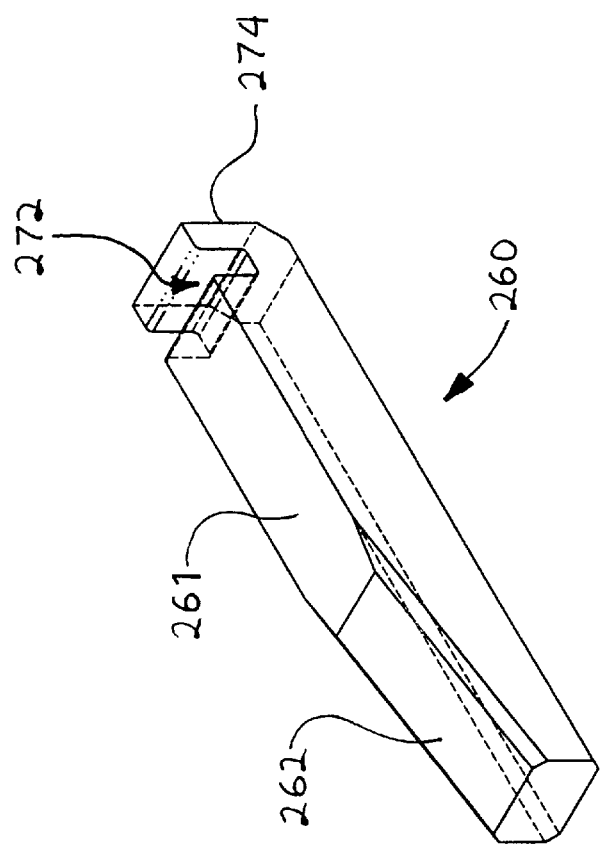
Fig. 60
Fig. 59
Fig. 61

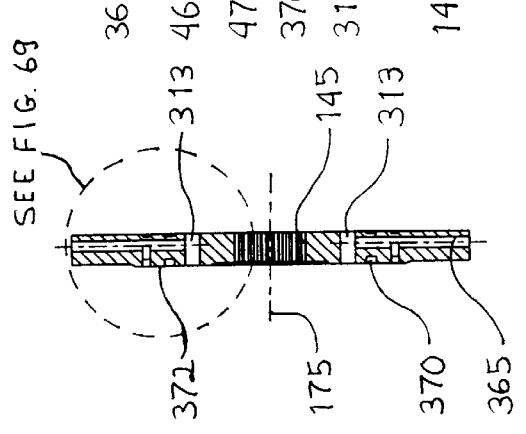
Fig. 69
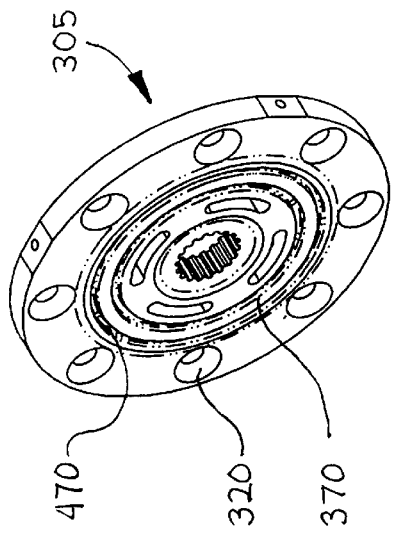
Fig. 65
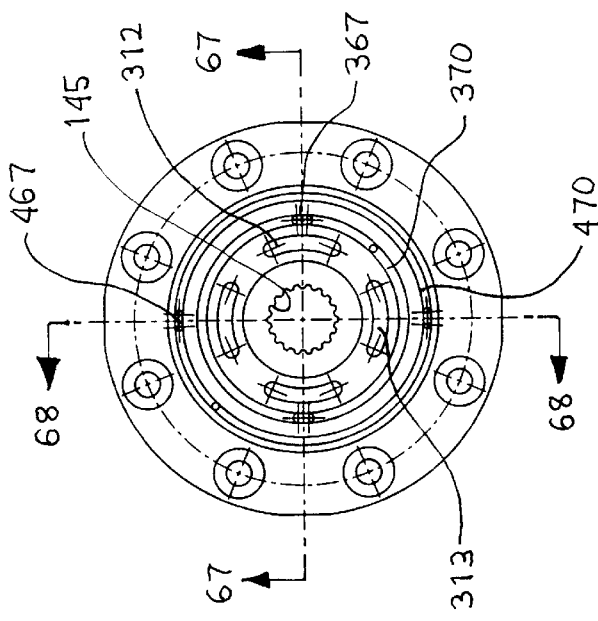
Fig. 66
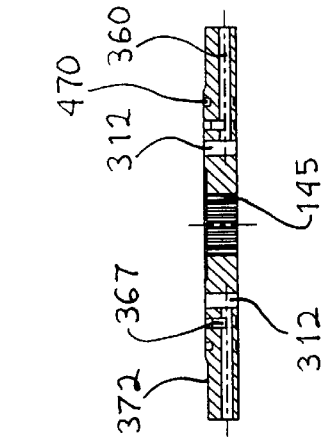
Fig. 68
Fig. 67

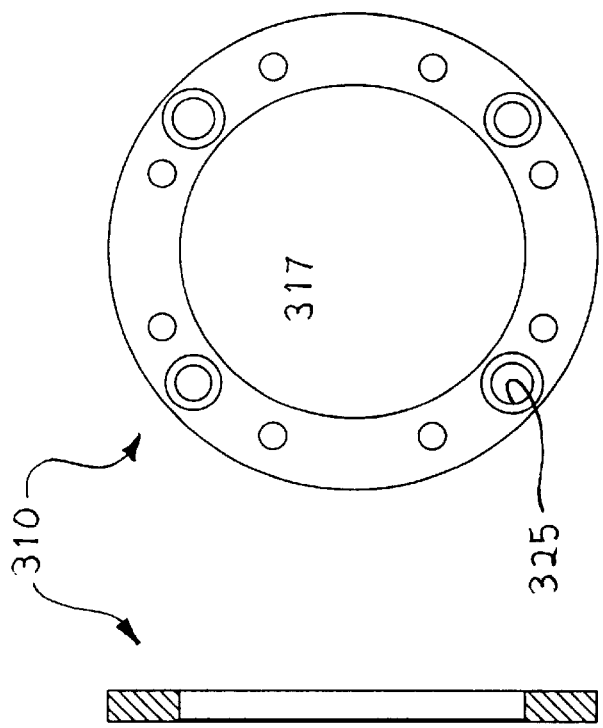
Fig. 73
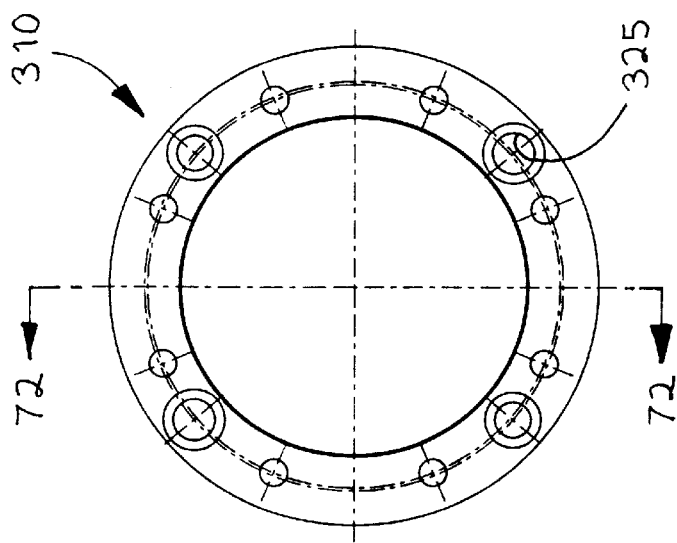
Fig. 72
Fig. 71
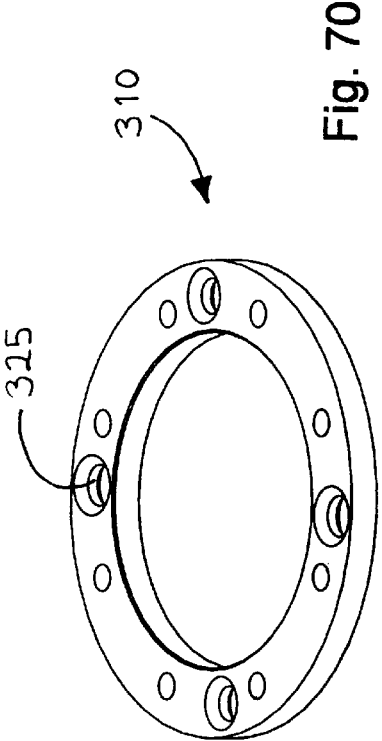
Fig. 70

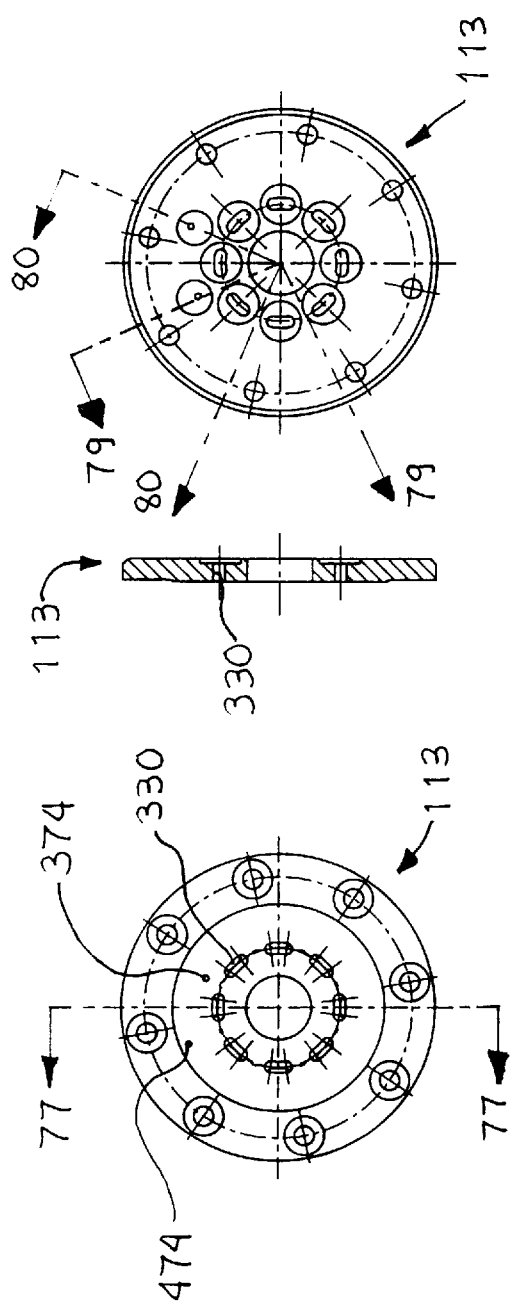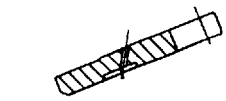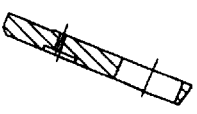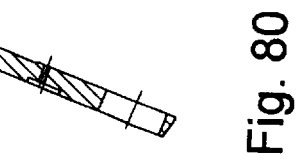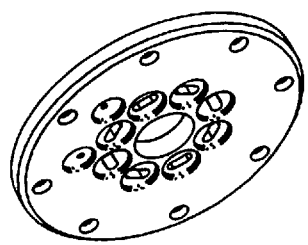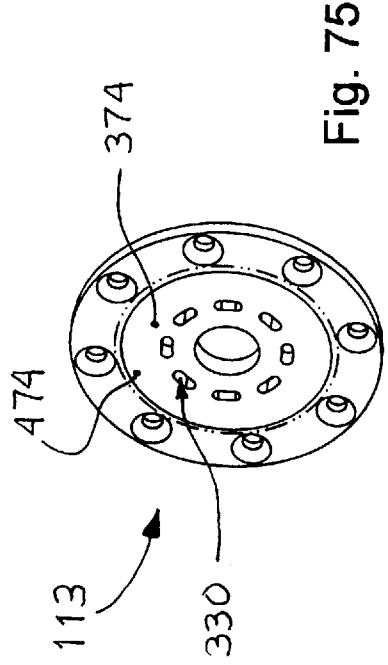

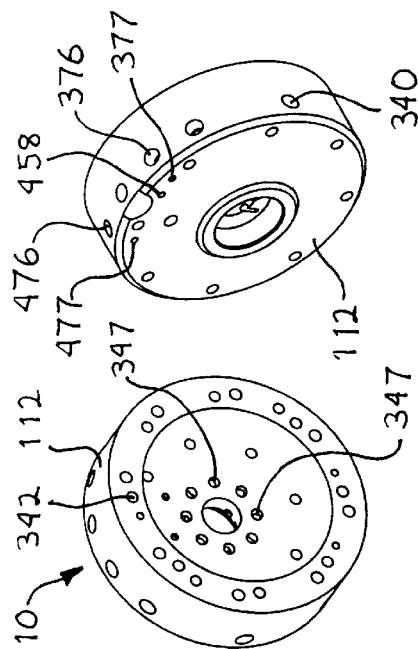
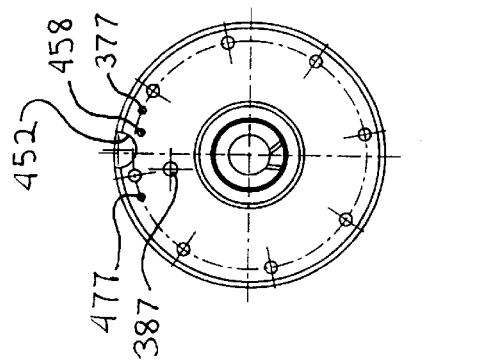
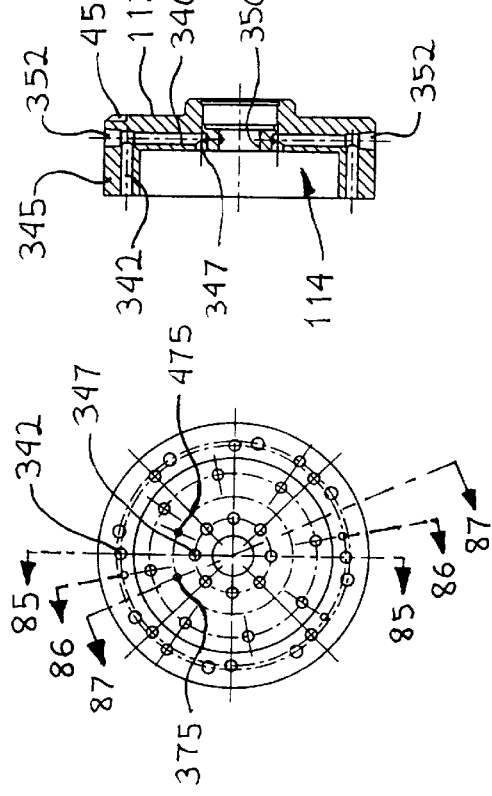
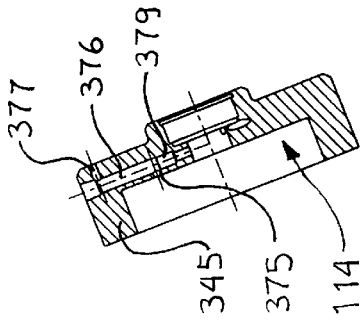
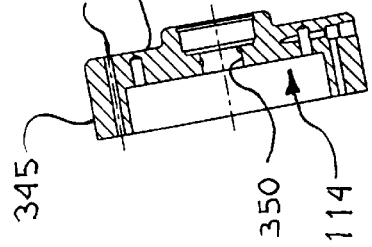

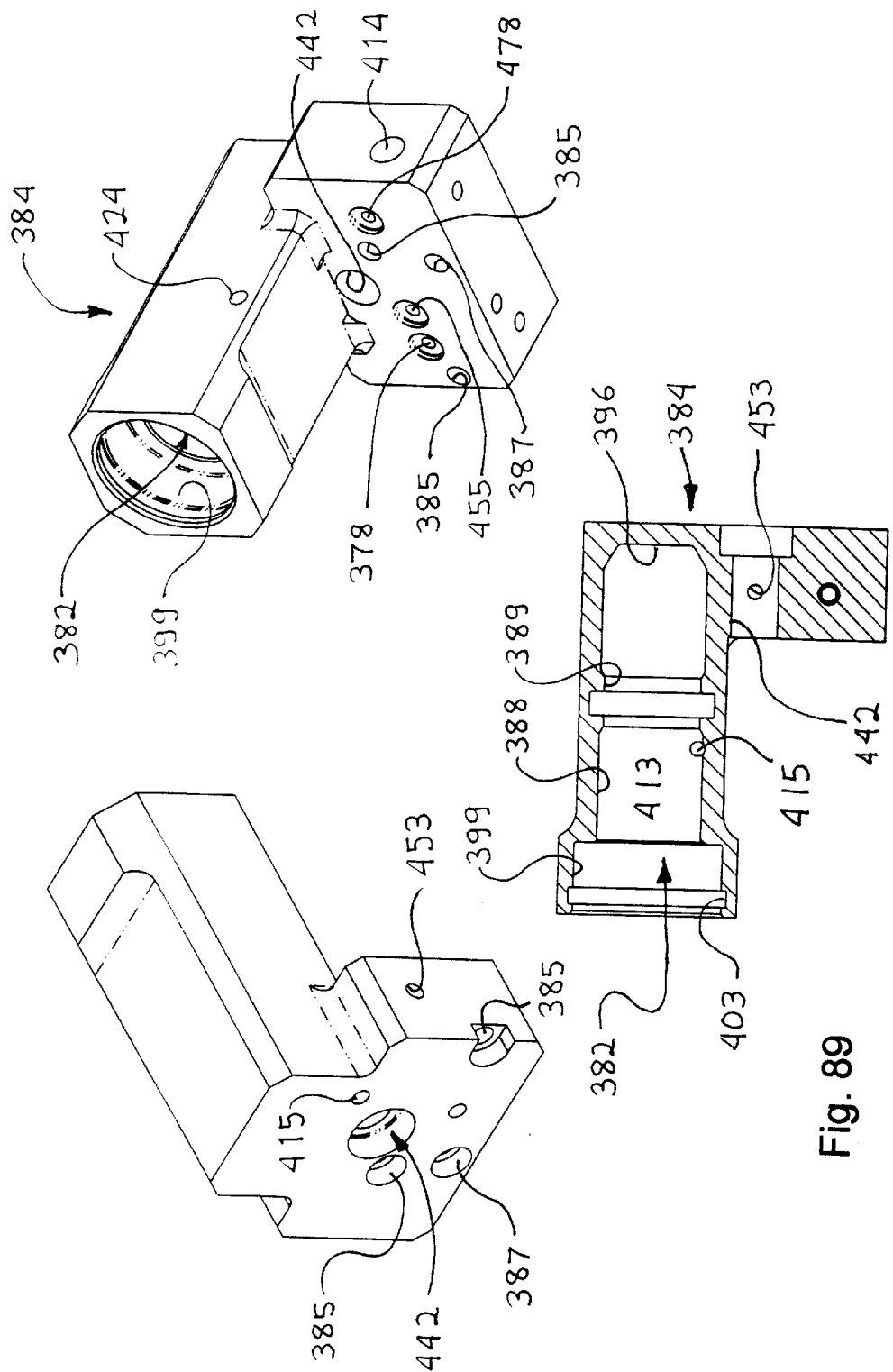

CONCENTRIC RADIAL PISTON TRANSMISSION WITH FLEXIBLE CAM RING

This application claims priority from Provisional Application number 60/037,566 filed Feb. 8, 1997.

TECHNICAL FIELD

This application pertains to a continuously variable hydrostatic transmission, and more particularly to continuously variable concentric radial piston pump and motor units interconnected by fluid and mechanical couplings and arranged in an axially compact concentric design.

BACKGROUND OF THE INVENTION

Many variable speed drive mechanisms of various designs are described in the literature or are commercially available. These mechanisms find application in fields as diverse as computers, machine tools, recreational vehicles, construction equipment, trucks and automobiles. They all share the basic function of converting the rotational speed and torque of an input shaft to a selected variable speed and torque at an output shaft.

Small recreational vehicles and personal transportation vehicles are ideal applications for an infinitely variable speed drive mechanism because of the improved economy, longer service life and low exhaust emissions that can be obtained by operating the vehicle's prime mover, such as an internal combustion engine, in the range of its optimum operating point and varying the speed of the vehicle by adjusting the transmission over a continuous range instead of changing the vehicle engine speed. Use of an efficient infinitely variable transmission in a large number of vehicles would save an inestimable amount of fuel and reduce the world-wide exhaust emissions more than any other know conservation and air purity stratagem now considered feasible.

Although many infinitely variable transmissions and continuously variable transmissions have been proposed and designed for vehicular applications, none has proven entirely satisfactory. Traction devices have been unable to demonstrate acceptable life and the transient torque conditions occurring in a normal vehicle driving cycle. Rubber belt variator devices, such as the centrifugal clutch commonly used in snowmobiles, do not offer adequate durability and efficiency, even in light vehicles with engine power on the order of only ten to fifteen horsepower. The most common application for this type of transmission is the snowmobile, where component life is not expected to exceed 100 hours.

Hydrostatic transmissions have existed for years and have been developed to a high degree of sophistication. These devices are in use in some military, agriculture and construction equipment, mining and other off-the-road vehicles, and in small garden tractors. A conventional hydrostatic transmission has two principal elements: a hydraulic pump driven by the prime mover, and a hydraulic motor powered by hydraulic fluid pressurized by the pump for driving the load. Either or both of these elements may be variable displacement to achieve the variable gear ratio of the transmission. Regardless of the configuration selected, the overall system efficiency can be no better than the product of the efficiencies of the individual elements. For example, if both the pump and motor are 95% efficient, the hydrostatic unit cannot achieve efficiency greater than (0.95×0.95)=90% and in practice it is usually significantly less than this because of flow losses in the hydraulic lines coupling the two elements. This efficiency is inferior to that offered by conventional automatic transmissions which can operate at steady state efficiency levels on the order of 97%–98% with torque converter lock-up, but the advantages of an infinitely variable transmission and the absence of a clutch outweigh the disadvantage of low efficiency in the applications in which conventional hydrostatic transmissions have been used successfully.

In addition to their low operating efficiencies, there are other disadvantages that have militated against the wide use of conventional hydrostatic transmissions. They are usually bulky, heavy and expensive. In addition, conventional hydrostatic transmissions are noisy, especially at the higher gear ratios where most over-the-road driving is done because the flow rate of the hydraulic fluid is greatest at the high gear ratios in these hydrostatic transmissions.

The integrated hydrostatic transmission, in which the motor and pump are combined in one unit to minimize fluid flow losses, is a step in the right direction. However, none of the prior art integrated hydrostatic transmissions overcome the condition which degrades their efficiency and contributes to their noisiness, namely, that the peak power rating of the transmission is attained at maximum pressure and flow. As a consequence, hydraulic losses associated with pressure, such as leakage and hysterisis losses during fluid compression and expansion will be greatest at maximum power throughput. Also, viscous flow losses which are proportional to fluid velocities are greatest at peak power/speed when the flow and pressure are at their highest levels.

The lack of enduring commercial uses of hydrostatic transmissions in production for vehicle or other uses that require a high power-to-weight ratio is believed to be due to four main reasons: 1) high cost, 2) high noise levels at normal operating conditions, (3) poor efficiency, and (4) lack of any significant weight and size advantage. However, modern production techniques have been developed that would make it possible to produce a hydrostatic transmission designed specifically for such applications at a cost approximately comparable to that of a prior art adjustable ratio variable transmission. The second and third factors, namely, noise and efficiency, have been the key factors discouraging adoption of a hydrostatic transmission by the recreational and personal vehicle industries. The size and weight factors could be significant if there were competing designs that satisfied the first three factors.

One effort to overcome some of the disadvantages of the conventional hydrostatic transmission is the power branching transmission. An early example of such a transmission is shown in U.S. Pat. No. 3,175,363 to Hans Molly. The power branching transmission was intended to reduce the fluid flow losses associated with the hydrostatic transmission, particularly as the transmission ratio moves toward unity, by transmitting a portion of the input power mechanically to the output shaft. Since the proportion of mechanically transmitted power increases to 100% at a 1:1 transmission ratio, the hydraulic losses are potentially much less in a power branching transmission.

Unfortunately, attempts to commercialize the power branching hydrostatic transmission have been unsuccessful, probably because the complexity of the system would compromise performance and increase cost to a noncompetitive level versus the conventional transmission. Also, the prior art power branching transmissions have not been able to achieve a dynamic balance of the rotating elements which would be a serious shortcoming since substantial vibration levels at operating speed would not be acceptable. In addition, prior art power branching transmissions have not been readily scaleable to make different sizes of a single design usable for different power ranges. Scalability could be an important feature in smaller applications such as snowmobiles and motorcycles where the ability to match the size, weight and cost of the transmission precisely with the power, torque and speed requirements could become competitively important.

If the power available in operation of a vehicle during braking and periods of low power requirements could be stored and made available for use during periods of auxiliary or high power requirements such as hydraulic power take-off, engine starting, and vehicle acceleration, the engine sizing for any given vehicle could be reduced substantially, since engines are normally sized for the maximum anticipated power requirements. The storage of hydraulic energy in an accumulator is a well known and understood technology and should encounter no resistance to use in motor vehicle applications as some new technologies have in the past, and the use of a moderately sized accumulator will add little weight and cost, certainly less than is saved by the use of a small light weight compact vane-type continuously variable transmission that makes possible the elimination of a clutch and a starter motor and makes possible the substantial downsizing of the engine because of the availability of the added hydraulic power source.

Thus, the transmission art has long needed an improved infinitely variable hydrostatic transmission that provides the advantages of the integrated hydrostatic transmission while markedly improving efficiency by reducing the hydraulic fluid losses associated with conventional hydrostatic transmissions, reducing the size, weight, cost, emissions and noise levels of operation, improving the performance near the neutral point, offering scalability of some basic machine designs, and reducing the manufacturing and maintenance costs.

SUMMARY OF INVENTION

Accordingly, it is an object of this invention to an axially compact hydrostatic transmission having a pump with a set of radial pistons and a motor with a set of radial pistons arranged concentrically with respect to the radial pistons of said pump. It is another object of this invention to provide an improved dynamically balanced power branching transmission in which fluid losses are reduced to near zero at maximum power throughput for steady state operating conditions, resulting in overall operation efficiencies comparable or superior to conventional automatic transmissions, but which enables the engine to maintain an operating level at or near its optimum operating point. Another object of this invention is to provide an improved hydrostatic transmission that is small, light weight, quiet, durable, inexpensive to produce and service, and offers system efficiency in a motor vehicle that is comparable or superior to conventional automatic transmissions. Yet another object of this invention is to provide an improved method of converting power in a rotating input shaft at one speed and torque to nearly the same power in an output shaft at a different speed and torque.

These and other objects of the invention are attained in a power branching transmission which has fluid openings for flow of fluid between radially juxtaposed or concentric radial piston pump and motor units, and an adjustable cam ring concentrically disposed in between the pump and motor units. The cam ring is driven by the pump pistons and also by the motor pistons in motor cylinders pressurized by fluid pressure generated in the pump. The cam ring is coupled to and drives an output shaft, providing an infinitely variable transmission ratio for the unit in an efficient and simple manner. Fluid taps in the housing can be coupled to a regenerative braking and accelerating unit, which could also provide engine starting using energy stored from the transmission.

DESCRIPTION OF THE DRAWINGS

The invention, and its many attendant objects and advantages, will become better understood upon reading the following description of the preferred embodiment in conjunction with the following drawings, wherein:

FIG. 2 is a perspective view of the hydrostatic transmission shown in FIG. 1;

FIG. 3 is an exploded perspective view if the hydrostatic transmission shown in FIG. 2, showing the major subassemblies in their correct relative positions;

FIG. 4 is a perspective view of the control assembly of the hydrostatic transmission shown in FIGS. 2 and 3, viewed from the side of the attachment flange;

FIG. 5 is a perspective view of the control assembly shown in FIG. 4, viewed from the opposite side;

FIG. 6 is an exploded perspective view of the control assembly shown in FIGS. 4 and 5;

FIG. 7 is a perspective view of the central assembly shown in FIG. 3;

FIG. 8 is an exploded perspective view of the central assembly shown in FIG. 7;

FIG. 17 is a perspective view of the concentric radial piston assembly shown in FIG. 8;

FIG. 18 is an exploded perspective view of the concentric radial piston assembly shown in FIG. 17;

FIG. 24 is a perspective view of the control assembly shown in FIG. 3;

FIG. 25 is an exploded perspective view of the control assembly shown in FIG. 24;

FIG. 44 is a perspective view of the motor stator of the concentric radial piston assembly shown in FIG. 43;

FIG. 45 is an end elevation of the motor stator shown in FIG. 44;

FIG. 46 is a sectional side elevation of the motor stator along lines 46—46 in FIG. 45;

FIG. 47 is a perspective view of a power piston shown in FIG. 43;

FIG. 48 is an end elevation of the piston shown in FIG. 47;

FIG. 49 is a side elevation of the piston shown in FIG. 47;

FIG. 53 is a perspective view of the cam ring shown in FIG. 18;

FIG. 54 is an exploded perspective view of the cam ring shown in FIG. 53;

FIG. 59 is a perspective view of a cam wedge shown in FIGS. 6 and 32;

FIG. 60 is a side elevation of the cam wedge shown in FIG. 59;

FIG. 61 is an end elevation if the cam wedge along lines 61—61 in FIG. 60;

FIG. 65 is a perspective view of the commutator plate shown in FIGS. 3 and 16, as viewed from the output side;

FIG. 66 is an end elevation of the output side of the commutator plate shown in FIG. 65;

FIG. 67 is a sectional side plan view along lines 67—67 in FIG. 66;

FIG. 68 is a sectional side elevation along lines 68—68 in FIG. 66;

FIG. 69 is an enlarged sectional elevation of a portion of the commutator plate indicated by the circle in FIG. 68;

FIG. 70 is a perspective view of the connector ring shown in FIGS. 3 and 16;

FIG. 71 is an end elevation of the connector ring shown in FIG. 70, as viewed from the input side;

FIG. 72 is a sectional side elevation along lines 72—72 in FIG. 71;

FIG. 73 is an end elevation of the connector ring shown in FIG. 70 as viewed from the output side;

FIG. 74 is a perspective view of the thrust plate shown in FIGS. 13, 14 and 32–34 as viewed from the output side;

FIG. 75 is a perspective view of the thrust plate shown in FIG. 74 as viewed from the input side;

FIG. 76 is an end elevation of the thrust plate shown in FIG. 75;

FIG. 77 is a sectional side elevation along lines 77—77 in FIG. 76;

FIG. 78 is an end elevation of the thrust plate shown in FIG. 74;

FIG. 79 is a sectional view along lines 79—79 in FIG. 78;

FIG. 80 is a sectional view along lines 80—80 in FIG. 78;

FIG. 81 is a perspective view of the rear housing shown in FIGS. 13 and 14, viewed from the rear end;

FIG. 82 is a perspective view of the rear housing shown in FIG. 81, viewed from the front end;

FIG. 83 is an end elevation of the rear housing shown in FIG. 81;

FIG. 84 is an end elevation of the rear housing shown in FIG. 82;

FIG. 85 is a sectional elevation along lines 85—85 in FIG. 84;

FIG. 86 is a sectional elevation along lines 86—86 in FIG. 84;

FIG. 87 is a sectional elevation along lines 87—87 in FIG. 84;

FIG. 88 is a perspective view from the front of the pressure compensator body shown in FIGS. 24, 25 and 34;

FIG. 89 is a sectional side elevation of the pressure compensator body shown in FIG. 88;

FIG. 90 is a perspective view of the pressure compensator body shown in FIG. 88 as viewed from the rear;

DESCRIPTION OF THE PREFERRED EMBODIMENT

Figure 1:
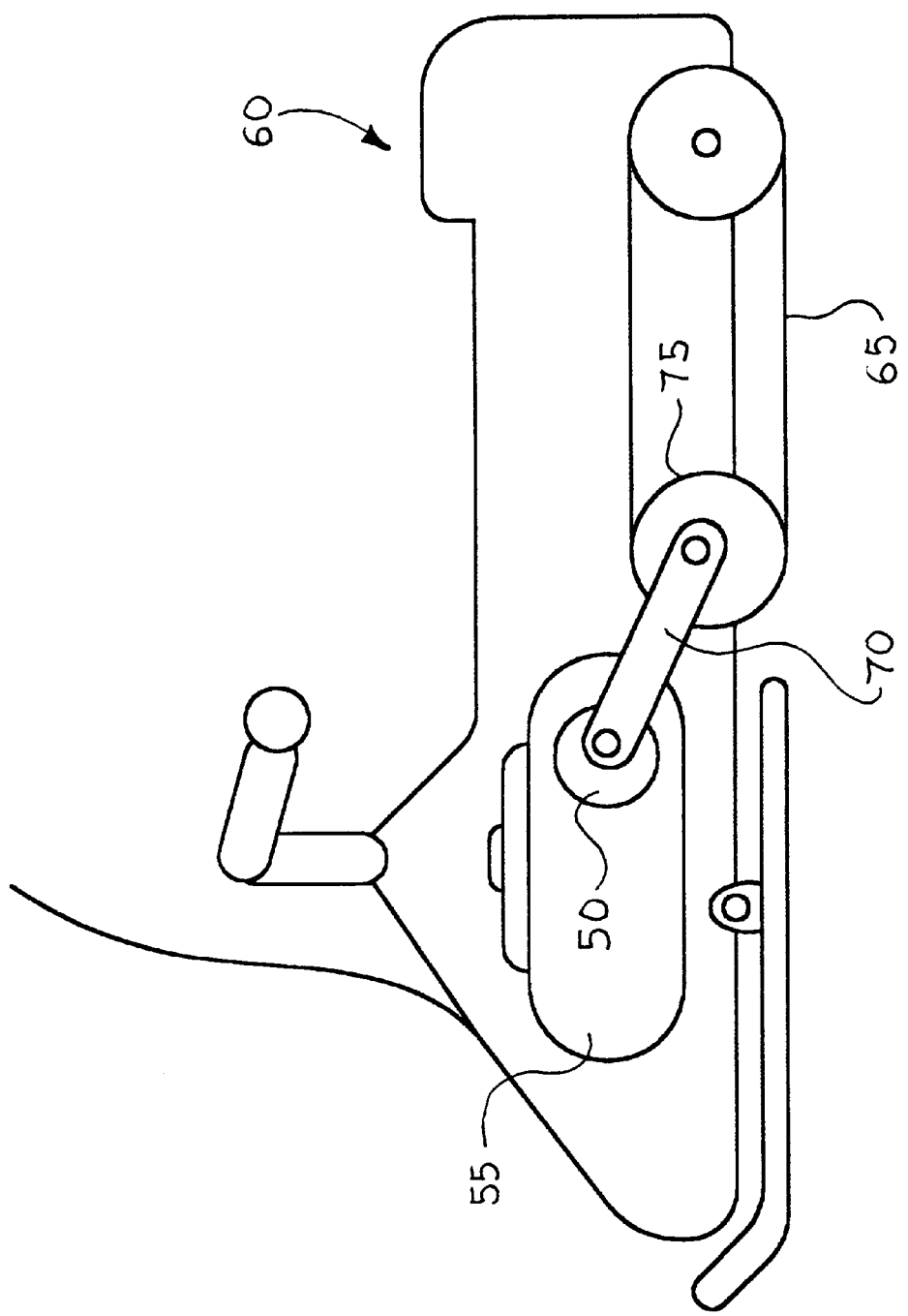
FIG. 1 is a schematic representation of a snowmobile having a hydrostatic transmission in accordance with this invention between the engine and the chain case.
Figure 12:
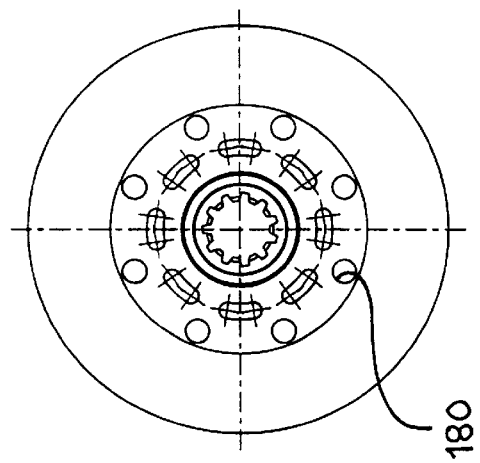
FIG. 12 is an end elevation of the input shaft shown in FIG. 9 from the back side.
Figure 11:
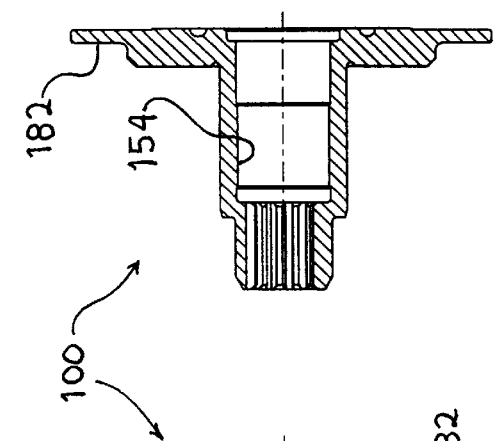
FIG. 11 is a sectional side elevation of the input shaft shown in FIG. 9.
Figure 10:
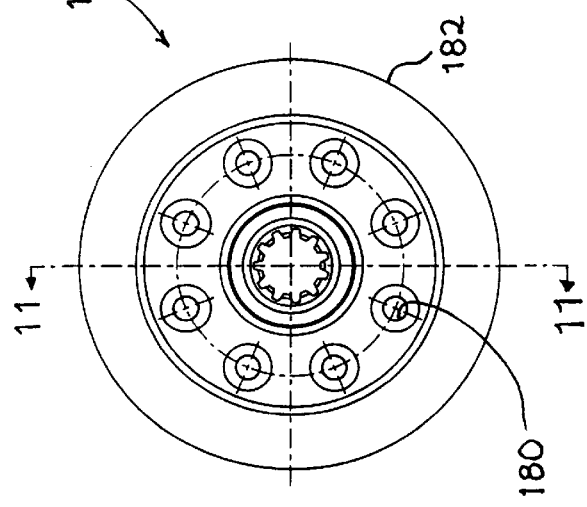
FIG. 10 is an end elevation of the input shaft shown in FIG. 9 from the input side.
Figure 9:
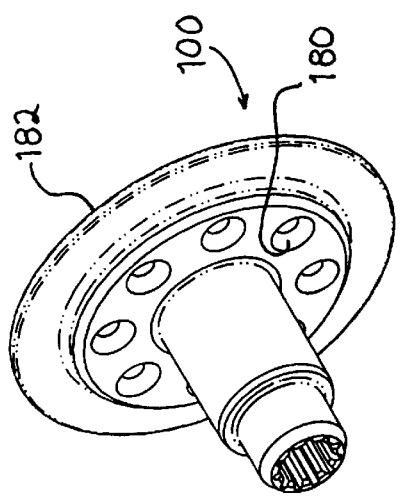
FIG. 9 is a perspective view of the input shaft sown in FIGS. 7 and 8.

A continuously variable hydrostatic transmission 50 is positioned between a prime mover 55 and a driven device in a vehicle. The vehicle could be any of numerous vehicles, such as a motorcycle or ATV, although in this application the vehicle is illustrated as a snowmobile 60 shown in FIG. 1. The driven device in a snowmobile is the belt or track 65, or more specifically, the chain case 70 and drive sprocket 75 that drives the track/belt 65. The conventional drive system of most snowmobiles uses a centrifugal clutch in which engine speed controls the operational diameter of an input sheave which drives a belt. The belt drives an output sheave on a shaft which in turn drives one end of a chain loop in a chain case, the other end of which drives the track/belt sprocket 75. The centrifugal clutch is heavy and expensive, and its belt has a short life and must be replaced often. Use of the continuously variable hydrostatic transmission 50 in the snowmobile drive train eliminates the use of the centrifugal clutch and its failure-prone belts, and makes it possible to drive the chain in the chain case directly from the transmission 50 as illustrated schematically in FIG. 1.

Figure 13:
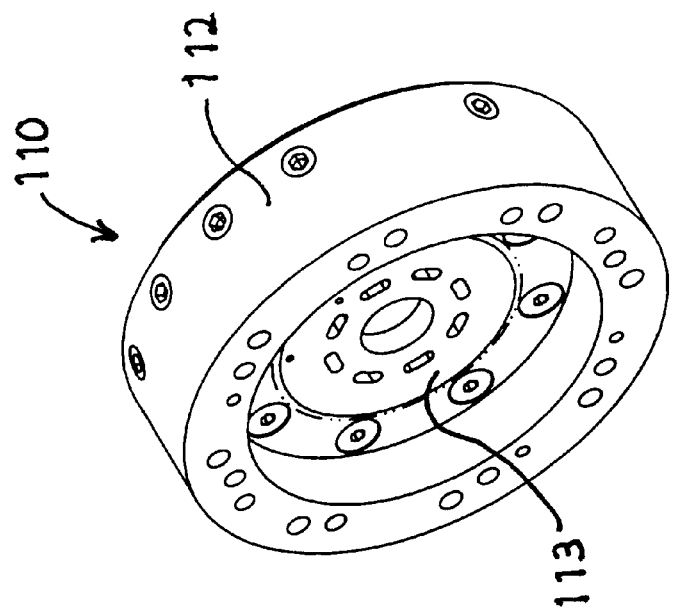
FIG. 13 is a perspective view of the rear housing assembly shown in FIG. 3.
Figure 14:
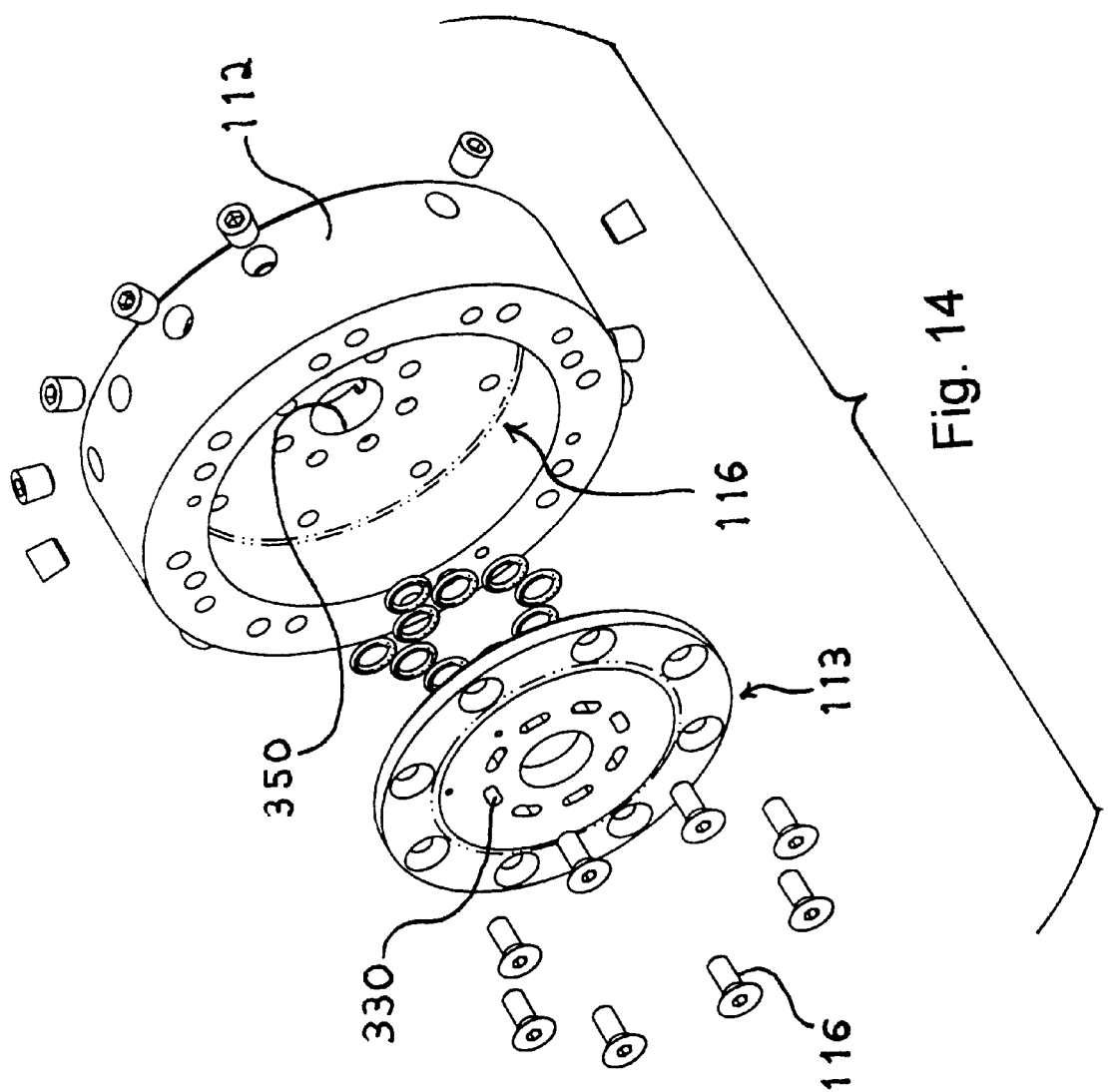
FIG. 14 is an exploded perspective view of the rear housing assembly shown in FIG. 13.

The transmission 50, shown assembled in FIG. 2 and shown exploded into its major subassemblies in FIG. 3, includes a control assembly 80, shown in FIGS. 4–6, for controlling the transmission ratio of the transmission 50, and a center assembly 90, shown in FIGS. 7 and 8, to which an input shaft 100, shown in FIGS. 9–12 is bolted, extending through the center of the control assembly 80. A rear housing assembly 110, shown in FIGS. 13 and 14, has a rear housing 112 and a thrust plate 113 fastened to the floor of a recess 114 by machine screws 116. The rear housing assembly 110 is bolted to the control assembly 80 through the center assembly 90 with eight Allen head bolts 115 threaded into tapped holes 117 in a front housing 162 of the control assembly to hold the entire assembly together. A commutator assembly 120, shown assembled in FIG. 15 and exploded in FIG. 16, is nested into the cylindrical recess 114 in the rear housing 112 and is driven by tabs 236 on a cam ring assembly 130, shown in FIGS. 18 and 53, in a concentric radial piston assembly 140, shown in FIGS. 17, 18 and 43. The commutator assembly 120 has an axial bore 145 that is splined to and drives a spline 147 on an output shaft 150, shown in FIGS. 19–23. The output shaft 150 is journaled at its input end in a needle bearing 152, shown in FIGS. 8 and 34A, held in the inner end of a bore 154 in the input shaft 100, and is supported at its output end in a bearing 156 mounted in a bearing recess 158 in the rear housing 112. A pressure compensation assembly 160, shown in FIGS. 3, 24, 25 and 34, is attached to the rear housing 112 to provide pressure compensation to the control assembly 80, as explained in detail below.

Figure 31:
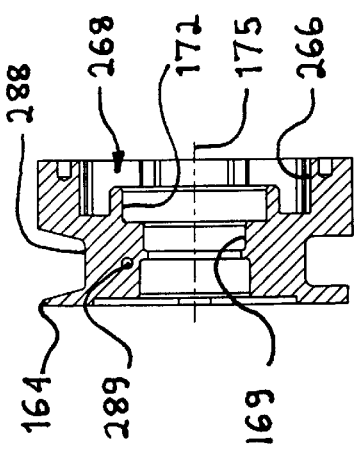
FIG. 31 is a sectional side elevation of the front housing shown in FIG. 28.
Figure 32:
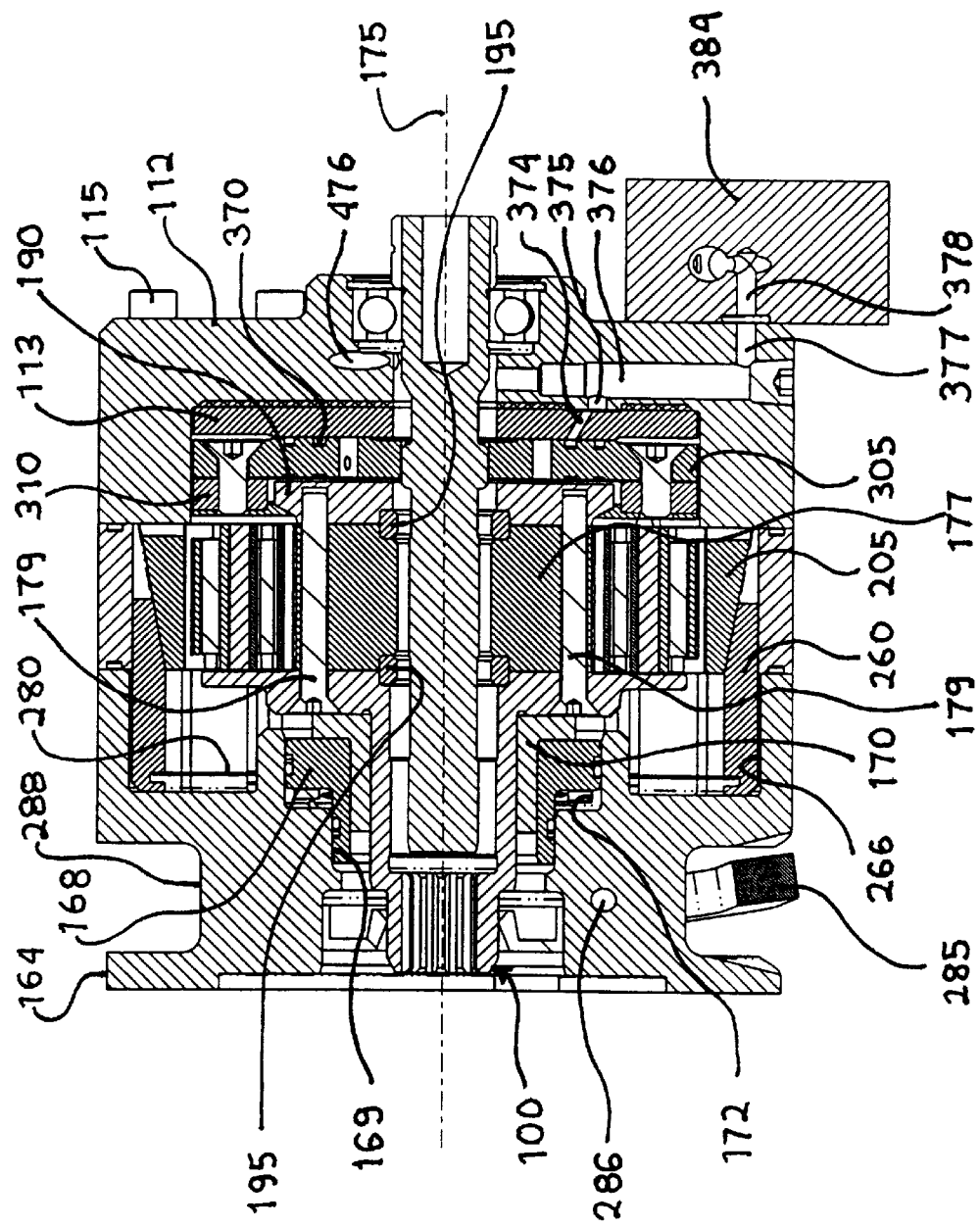
FIG. 32 is a sectional elevation of the hydrostatic transmission shown in FIG. 2 through the cam wedges.

The control assembly 80, shown in FIGS. 2–6, has a front housing 162, shown in FIGS. 26–31, having a mounting flange 164 on its front end. Four bolt holes 166 in the mounting flange 164 receive bolts (not shown) for attaching the transmission to the prime mover 55 or to a fixed frame of the vehicle. A thrust piston 168 is mounted in an axial bore 169 and counterbore 172, as shown in FIGS. 5, 31, and 32, and thrust and journal bearings 170 in the thrust piston 168 support the input shaft 100 for rotation about the central axis 175 of the machine. The cylinder formed by the counterbore 172, in which the thrust piston 168 moves axially, is pressurized by system pressure conveyed thereto from the pressure compensation assembly 160 through a hole 171 (shown in FIG. 34A) drilled in the front housing 162 and communicating with an axial hole 176 which aligns with a hole 224 in a motor stator 174 of the concentric radial piston assembly 140 and a hole 458 in the rear housing 110 leading to a source of load compensated system pressure in the pressure compensation assembly 160. A wave spring 173 is disposed in the counterbore 172 bearing against the thrust piston 168 to maintain sealing pressure thereagainst during startup before system pressure is established.

Figure 33:
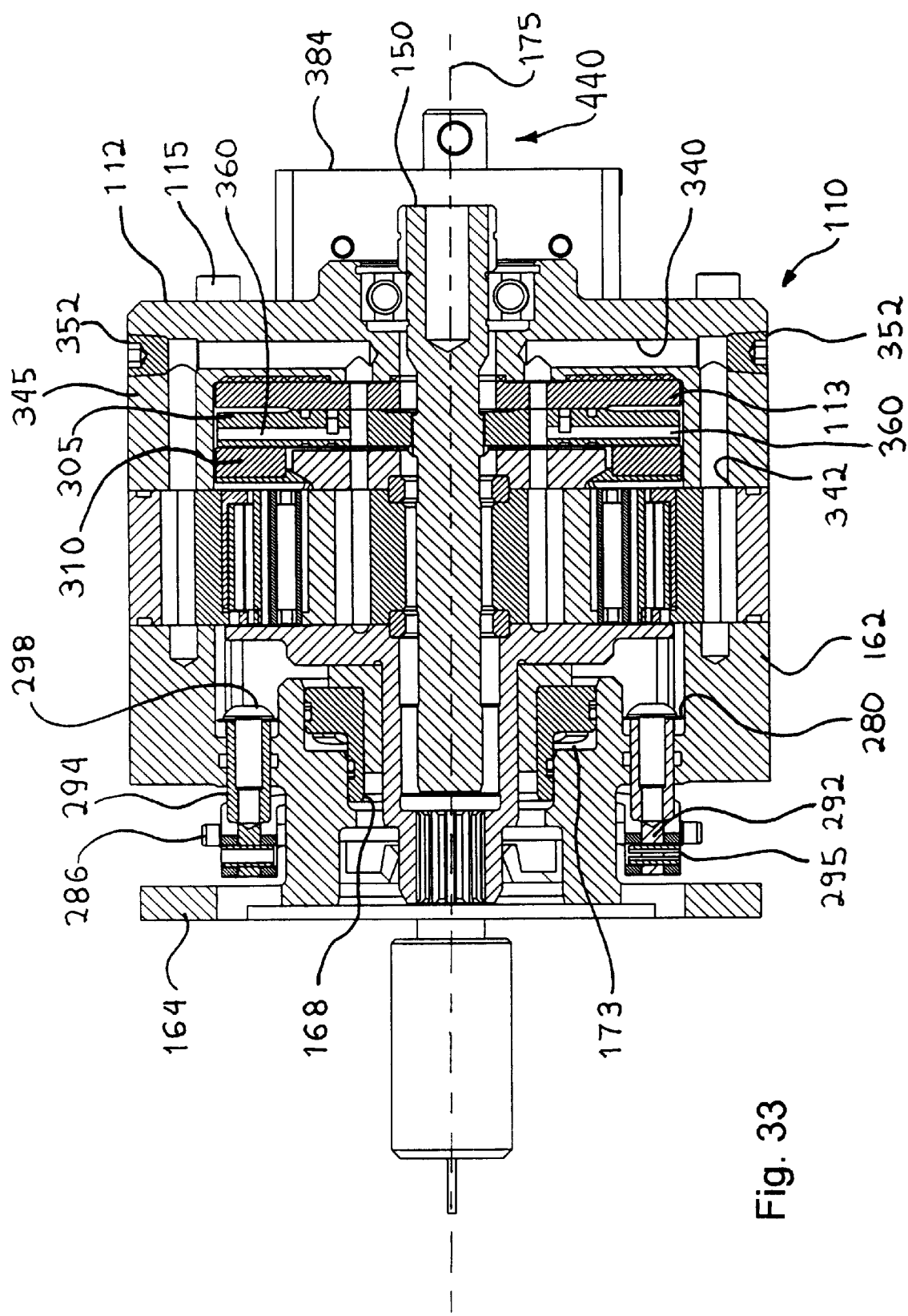
FIG. 33 is a sectional plan view, looking up, of the hydrostatic transmission shown in FIG. 2 through the spring finger ring control studs.
Figure 34:
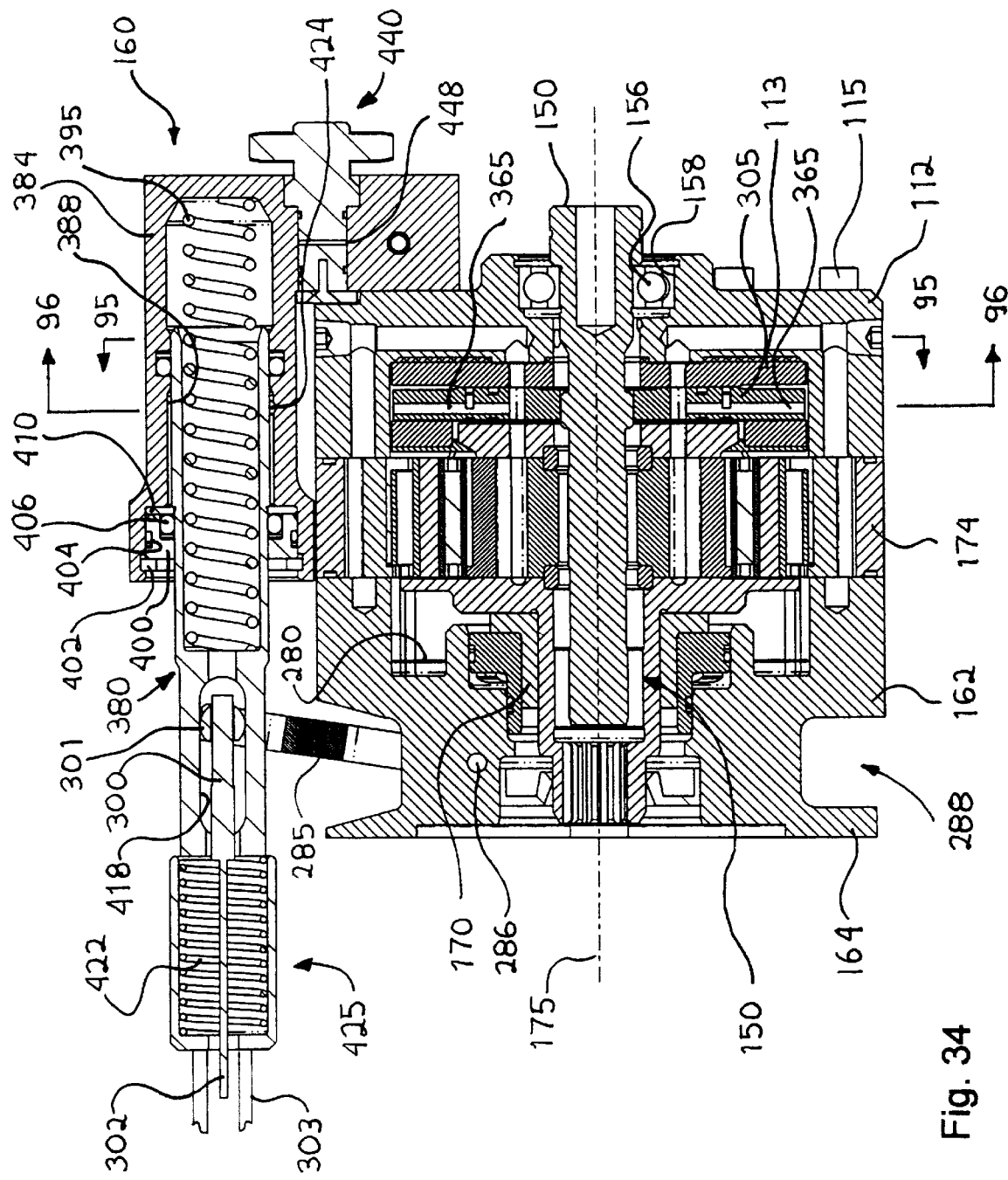
FIG. 34 is a sectional elevation of the hydrostatic transmission shown in FIG. 2 through the control assembly shown in FIGS. 24 and 25.
Figure 37:
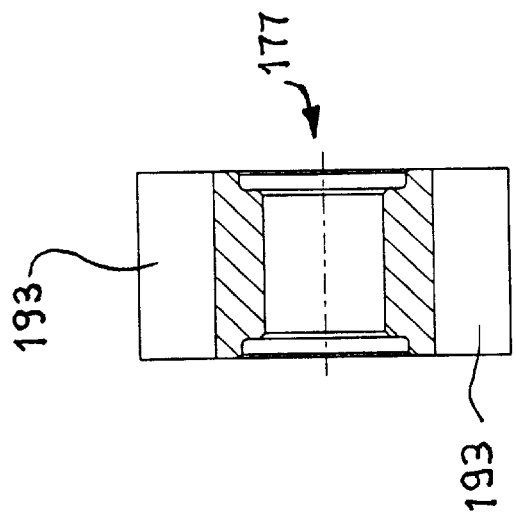
FIG. 37 is a sectional side elevation of the pump rotor along lines 37—37 in FIG. 36.
Figure 36:
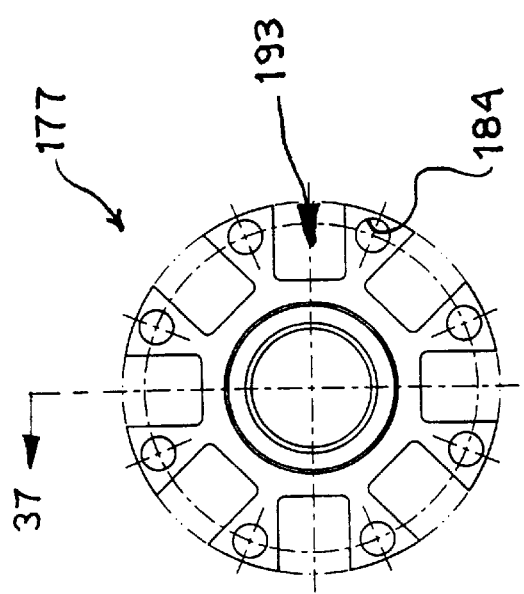
FIG. 36 is an end elevation of the pump rotor shown in FIG. 35.
Figure 35:
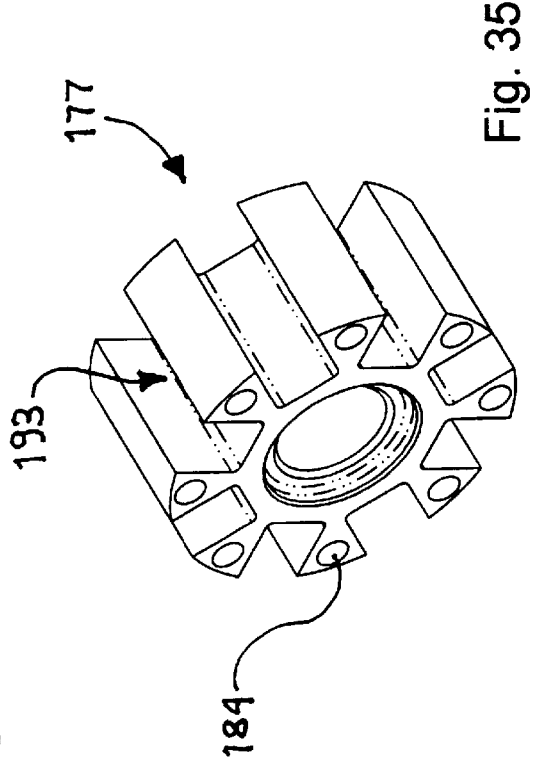
FIG. 35 is a perspective view of the pump rotor shown in FIG. 18.
Figure 42:
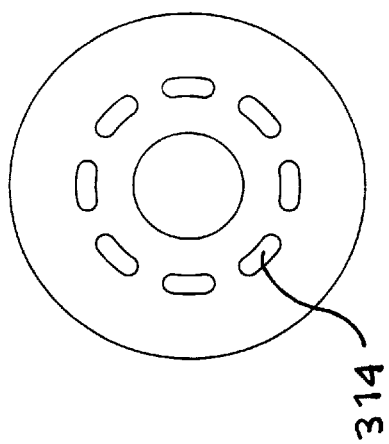
FIG. 42 is an end elevation of the end plate shown in FIG. 8, viewed from the side shown in FIG. 39.
Figure 41:
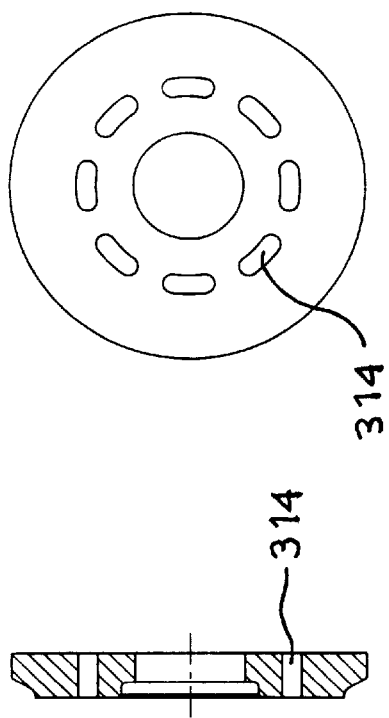
FIG. 41 is a sectional side elevation of the end plate shown in FIG. 38.
Figure 39:
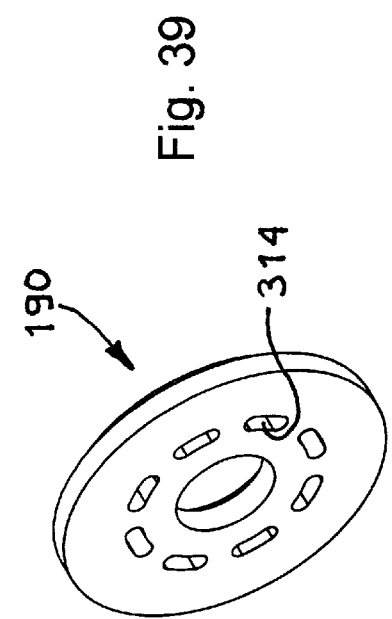
FIG. 39 is a perspective view of the end plate shown in FIG. 8 viewed from the output side.
Figure 40:
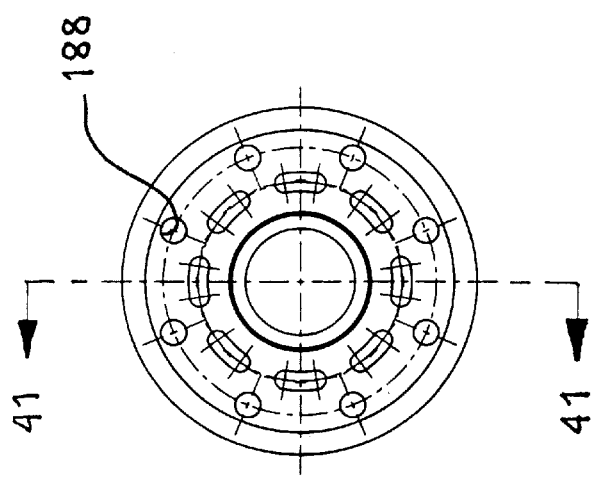
FIG. 40 is an end elevation of the end plate shown in FIG. 38.
Figure 38:
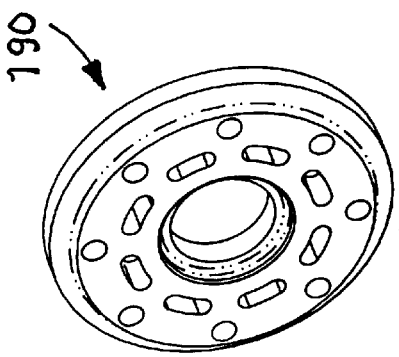
FIG. 38 is a perspective view of the end plate shown in FIG. 8 viewed from the input side.

The input shaft 100 is attached to a pump rotor 177, shown in FIGS. 35–37, by machine screws 179, as shown in FIGS. 7, 8 and 32, which extend through counter-sunk holes 180 in a radial flange 182 of the input shaft 100 and matching holes 184 in the pump rotor 177, and are threaded into holes 188 tapped in an end plate 190, shown in FIGS. 7 and 32–34, and shown in detail in FIGS. 38–42. Pilot rings 195 shown in FIGS. 8 and 32 ensure concentricity of the input shaft 100 with the pump rotor 177, respectively. The input shaft 100, the pump rotor 177 and the end plate 190 thus all rotate together as a unit.

Figure 43:
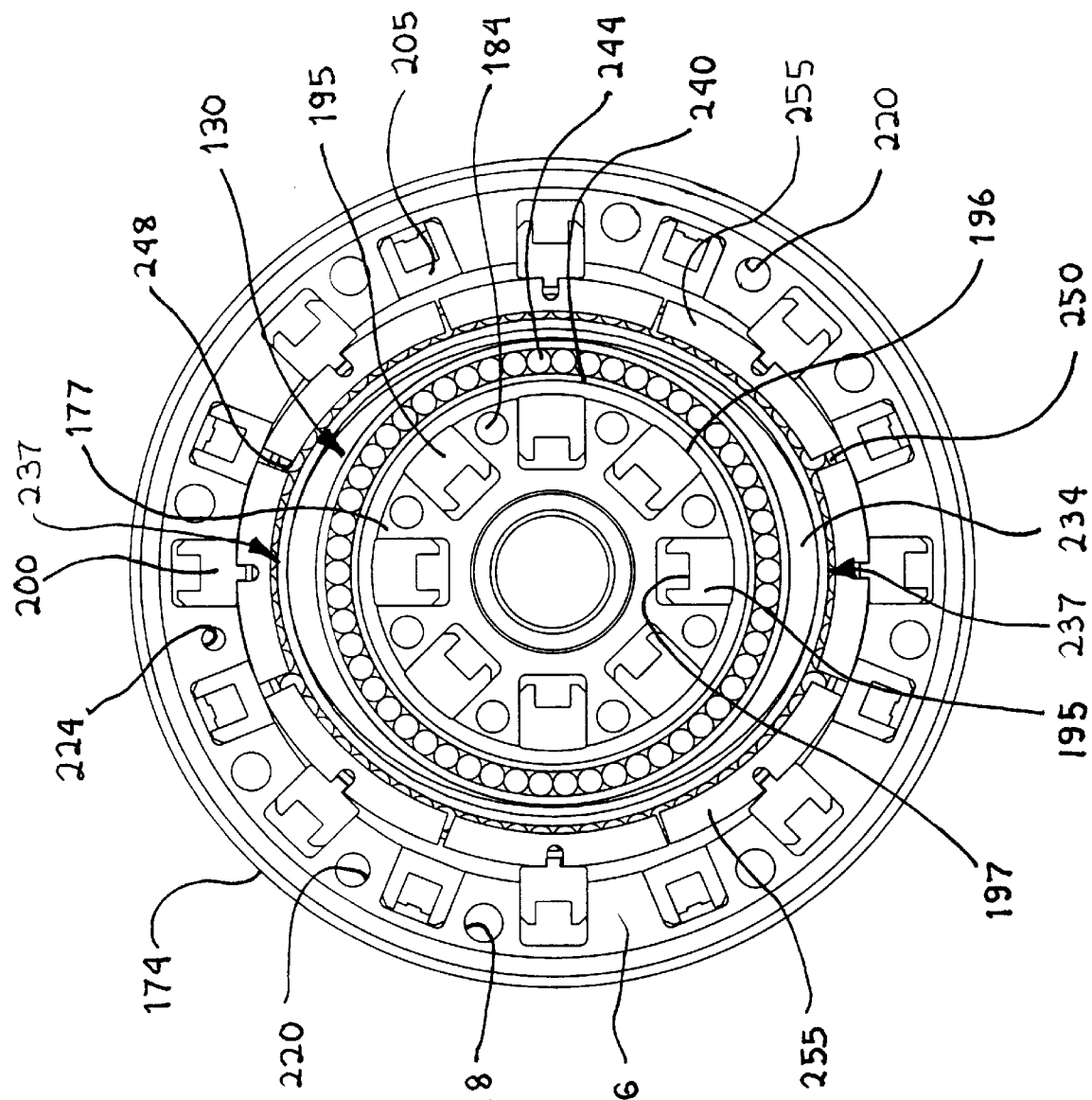
FIG. 43 is an end elevation of the concentric radial piston assembly shown in FIG. 17.

The concentric radial piston assembly 140, shown assembled in FIGS. 8, 17, and 43, and shown exploded in FIG. 18, includes a radial piston pump 191, a radial piston motor 192 disposed concentrically around the pump 191, and the cam ring 130 disposed concentrically between the pump 191 and the motor 192. The pump 191 includes the pump rotor 177 bolted to the input shaft 100 as shown in FIGS. 7 and 8, concentrically arranged within the motor stator 174. The pump rotor 177 includes a plurality of axially extending, radially opening channels 193, each receiving a rectangular piston 195 having a cylindrical face 196 facing radially outward and a slotted inner face 197, as shown in FIGS. 18 and 43. The pump pistons 195 are all shown fully retracted into the pump channels 193 for clarity of illustration, although in operation they would all be in contact with the flexible bearing ring 240. The embodiment illustrated has eight pump pistons 195, although a larger or smaller number of pistons could be used in larger or smaller units.

Figure 52:
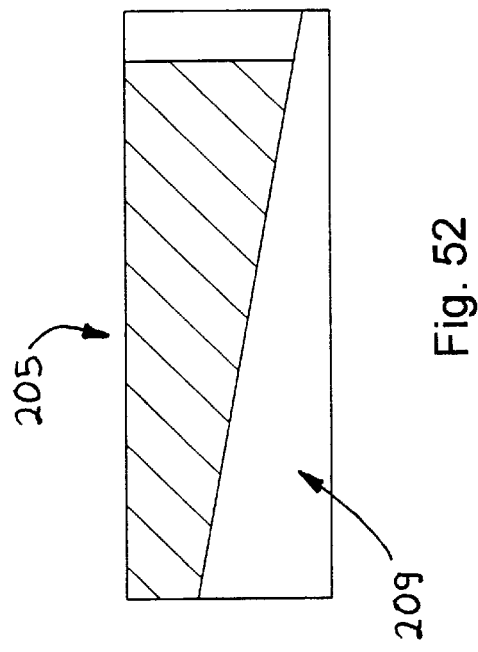
FIG. 52 is a sectional side elevation along lines 52—52 in FIG. 51.
Figure 51:
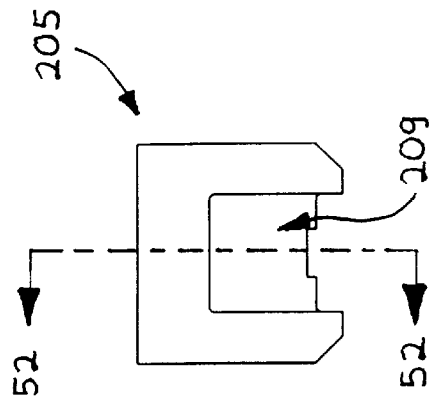
FIG. 51 is an end elevation of the stator control piston shown in FIG. 50.
Figure 50:
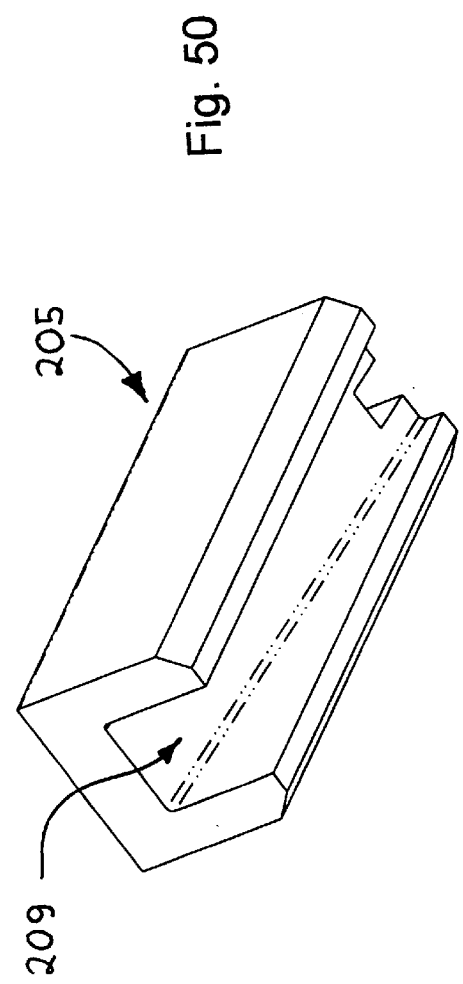
FIG. 50 is a perspective view of a stator control piston shown in FIG. 44.

The motor 192 includes the stator 174, shown in FIGS. 8, 17, 18 and 43, and shown in detail in FIGS. 44–46. The stator 174 is a cylindrical ring having a plurality of axially extending, radially opening channels 198, each having a rectangular piston having a flat face facing radially inwards. In this embodiment, there are sixteen channels 198, every other one of which hold power pistons 200, shown in detail in FIGS. 47–49, and the others of which hold control pistons 205, shown in detail in FIGS. 50–52. Each power piston 200 has a rectangular slot 207 in its outer face, as shown in FIGS. 47 and 48, and each control piston 205 has a wedge-shaped slot 209 in its outer face, as shown in FIGS. 32, 50 and 52. The motor stator 174 has an annular groove 212 on each axial face for receiving a sealing "O" ring 214, shown in FIG. 3, to provide a fluid-tight seal between the stator 174 and the front and rear housings 162 and 110 when they are bolted together as shown in FIGS. 2 and 32–34. Merlons 216 between the channels 198 define the radial channel sides of the channels 198 and also have holes 218 through which the tie bolts 115 extend in every other merlon 216. Two alignment holes 220 on opposite sides of the stator 174 receive a pair of ground alignment pins 222, shown in FIG. 3, for aligning the motor stator 174 with the front and rear housings 162 and 112, and a fluid passage hole 224 is drilled in alignment with holes 176 and 458 in the front and rear housings 162 and 112, respectively, as shown in FIG. 34A, for pressurizing the counterbore 172 to exert a fluid pressure force against the thrust piston 168.

The cam ring 130 shown in FIGS. 17, 18, and 43, and shown in detail in FIGS. 53 and 54, includes an inner sleeve 230 having a circular profile, an outer sleeve 232 having an elliptical profile, and two lunette inserts 234 bonded to the outer and inner surfaces of the inner and outer sleeves 230 and 232, respectively. The inserts 234 are made of a tough elastic material such a polypropylene or the like. Four tabs 236 project axially from the outer sleeve 232 through openings 235 in a wear plate 238 and into axial openings 325 in a connector ring 310 of the commutator assembly 120, shown in FIGS. 3 and 15, for driving the commutator assembly 120 and the output shaft 150 splined thereto. Thus, the cam ring 130, the wear plate 238, and the connector ring 310 provide an output torque path to the output shaft 150. The cam ring has at least one lobe, preferably two diametrically opposed lobes 237 formed by the thickness at the center portion of the lunette inserts 234. The opposed lobes 237 have sloping, surfaces for 1) driving the pump pistons 195 into the pump cylinders as the pump rotates around the cam ring to pressurize and displace fluid from the pump cylinders, and for 2) being driven rotationally by the radial motor pistons 200 in the inwardly opening cylinders of the motor pressurized by fluid pressurized and displaced by the pump.

Figure 34A:
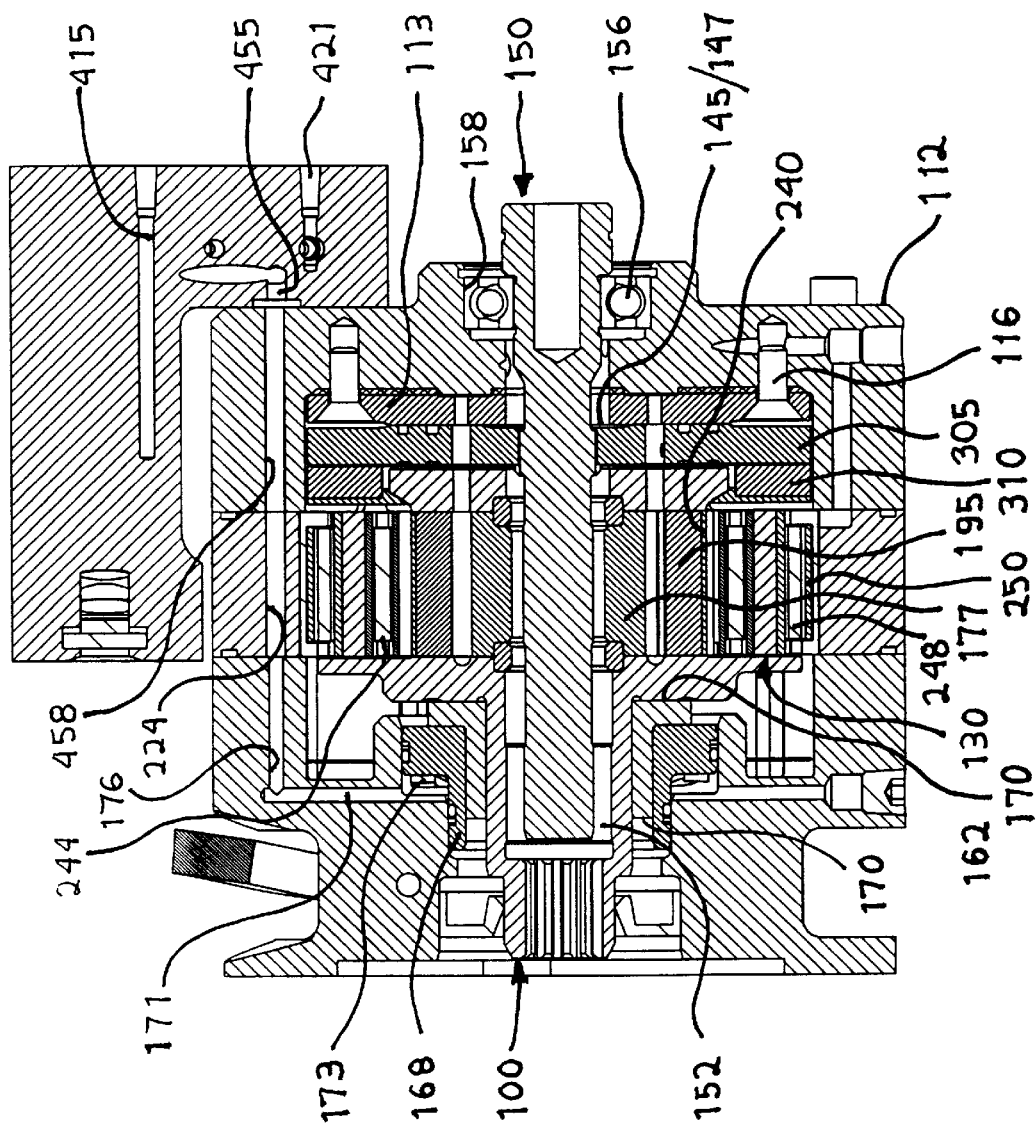
FIG. 34A is a sectional elevation along lines 34A—34A in FIG. 96.

A flexible bearing ring 240 surrounds the pump rotor 177 at a slight radial spacing, as shown in FIGS. 18, 34A and 43, of about one half of the difference between the minor and major axis of the ellipse of the outer cam sleeve 232. The pump pistons 195 will normally be biased in their channels 193 radially outward against the bearing ring 240 by pressurized hydraulic fluid in the channels 193, although they are shown retracted to illustrate the spacing between the ring 240 and the rotor 177. A series of needle bearings 244 is arrayed around the bearing ring 240, in contact with it and the inner sleeve 230 of the cam ring 130. The bearing ring 240 rotates with the pump rotor 177 and the needle bearings 244 reduce the friction that would otherwise exist between the faces of the pistons 195 and the cam ring 130, thereby improving the pumping efficiency of the pump 191 and reducing wear on the pistons 195. Similarly, a series of needle bearings 248 is arrayed around the outer sleeve 232 of the cam ring 130 and the needle bearings 248 are in turn surrounded by an outer flexible bearing ring 250 which is non-rotational with respect to the motor stator 174. The needle bearings 248 roll around the inside surface of the outer flexible bearing ring 250, to provide a low friction interface between the cam ring 130 and the motor power pistons 200 and control pistons 205.

Figure 55:
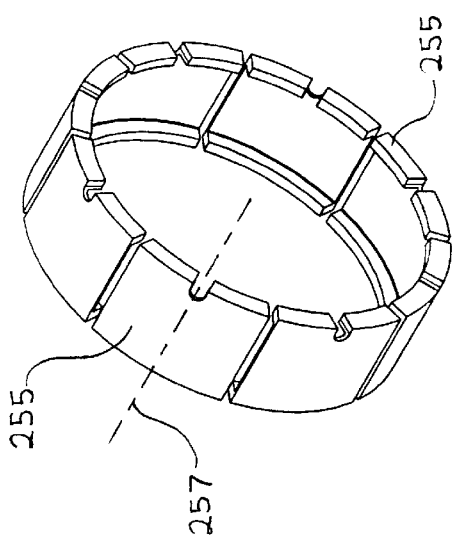
FIG. 55 is a perspective view of the individual control segments arranged in an annular array as shown in FIG. 18.
Figure 57:
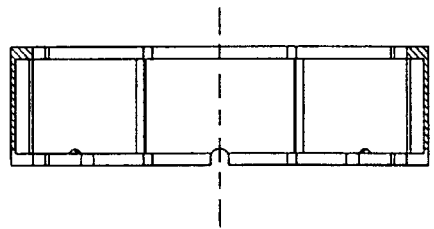
FIG. 57 is a sectional elevation along lines 57—57 in FIG. 56.
Figure 58:
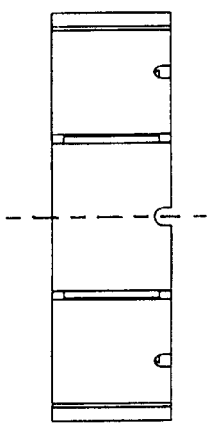
FIG. 58 is a plan view along lines 58—58 in FIG. 57.
Figure 56:
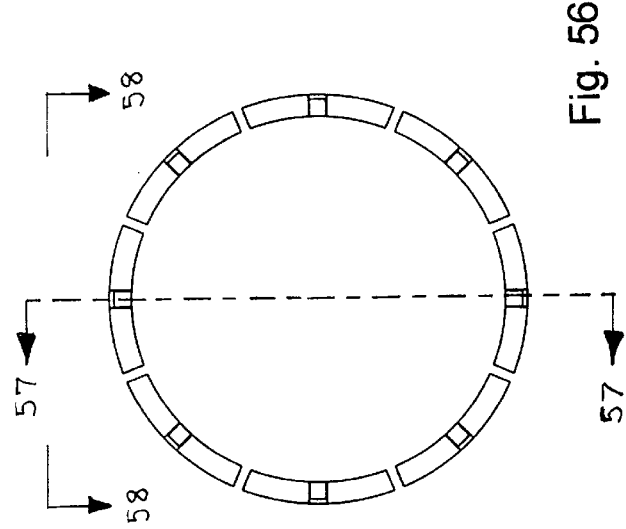
FIG. 56 is an end elevation of the annular array of individual control segments shown in FIG. 55.

An annular array of control segments 255, each identical to the others as shown in FIGS. 18 and 55–57, surrounds the outer bearing ring 250 and are engaged by the control pistons 205 and the power pistons 200. The control pistons engage the control segments 255 at the junctions between the segments 255, and the power pistons 200 engage the segments 255 at the circumferential centerline 257 of each segment, as shown in FIG. 55. The control segments 255 distribute the control forces exerted by the control pistons 205 uniformly on the cam ring 130 to make the shape of the cam ring 130 more regular than it otherwise would be if the control pistons acted on the outer bearing ring 250 directly.

Rotation of the pump rotor 177 in the configuration shown in FIG. 43 results in no pumping because the bearing ring 240 is circular, so the pump pistons 195 remain radially stationary in their channels 193. To cause the pump 191 to begin displacing fluid, the control pistons 205 are moved radially inward, forcing the major axis of the outer surface of the can ring 130 radially inward. This distortion of the cam ring changes the shape of the inner cam ring surface from circular to elliptical and causes the pump pistons 195 engaged with the inner surface of the inner bearing ring 240 to reciprocate in their channels 193, as they are driven around the cam ring by the rotating pump rotor 177, with a stroke that is equal to the difference between the major axis and minor axis of the inside surface of the cam ring 130. The displacement of the pump 191 is thus controlable by the radial extension of the control pistons 205 in the stator 174.

Figure 29:
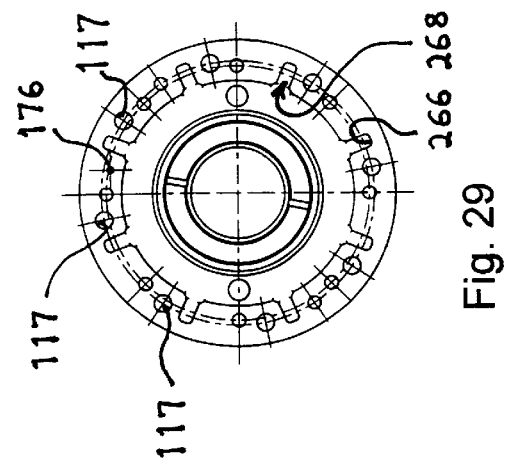
FIG. 29 is an end elevation of the inside end of the front housing shown in FIG. 27.
Figure 27:
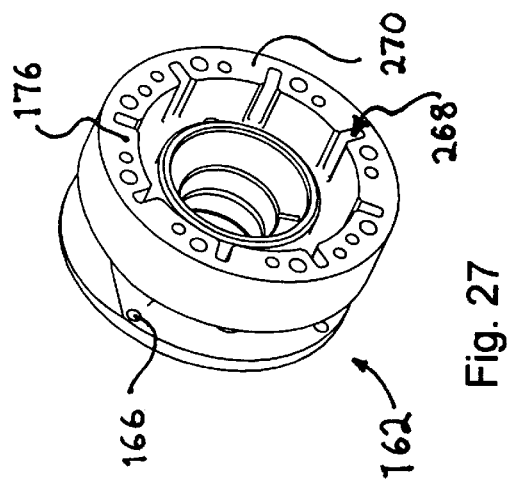
FIG. 27 is a perspective view of the front housing shown in FIG. 26, viewed from the opposite side.
Figure 64:
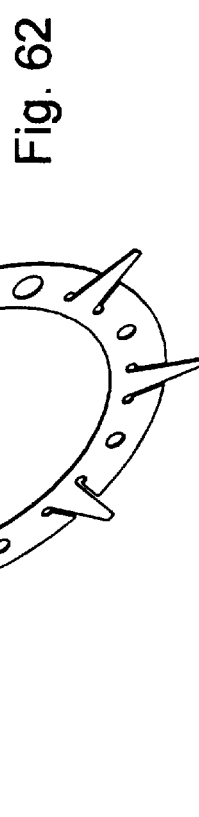
FIG. 64 is a side elevation of the finger spring ring shown in FIG. 63.
Figure 63:
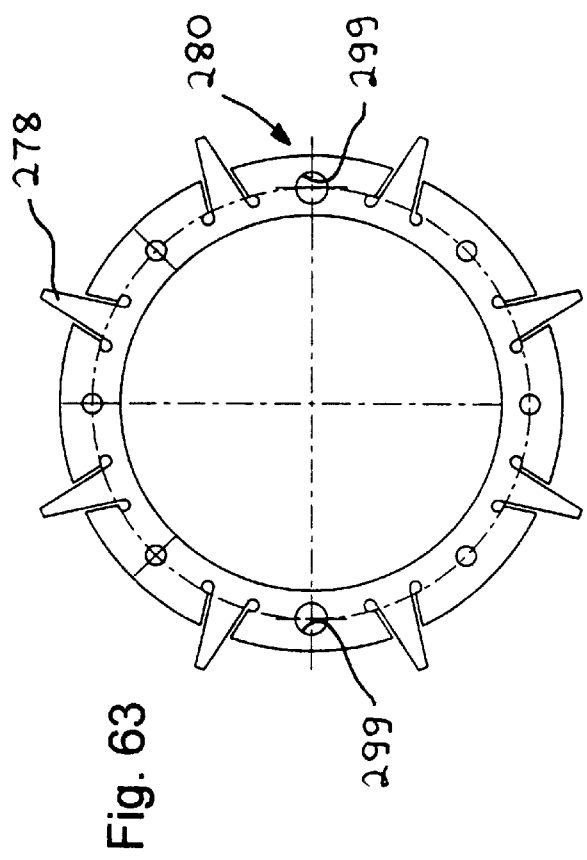
FIG. 63 is and end elevation of the finger spring ring shown in FIG. 62.
Figure 62:
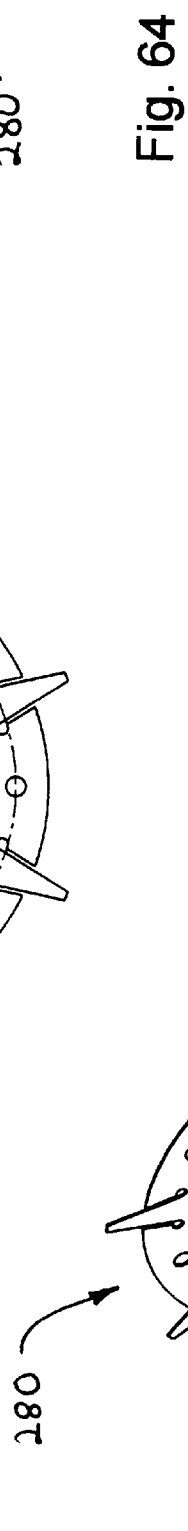
FIG. 62 is a perspective view of the finger spring ring shown in FIGS. 6 and 32.
Figure 93:
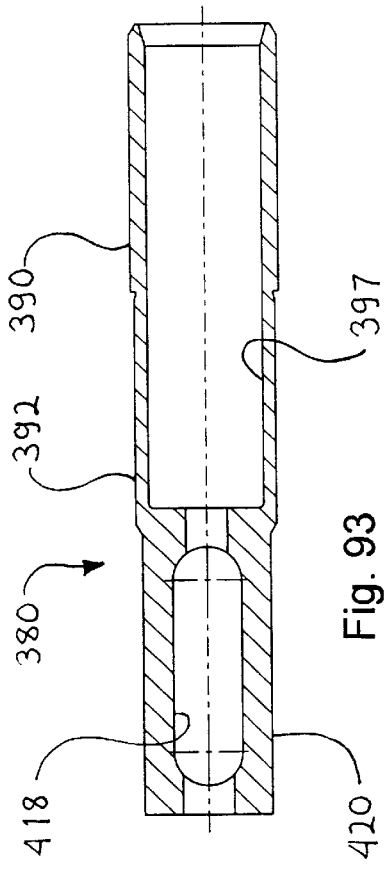
FIG. 93 is a sectional elevation along lines 92—92 in FIG. 91.
Figure 91:
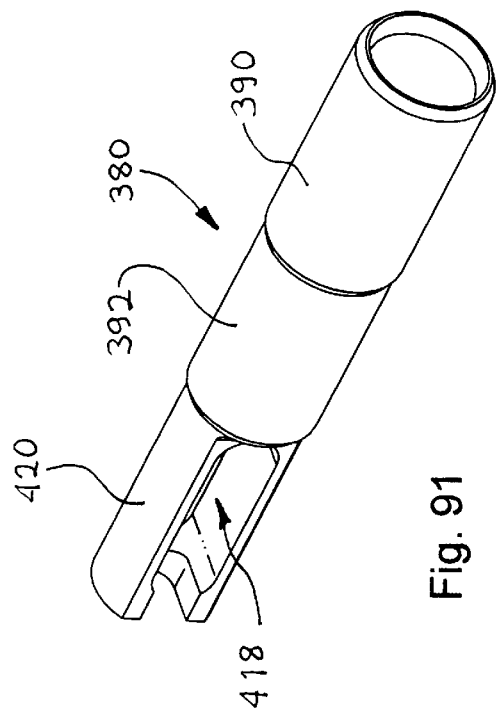
FIG. 91 is a perspective view of the control plunger shown in FIGS. 24, 25 and 34.
Figure 92:
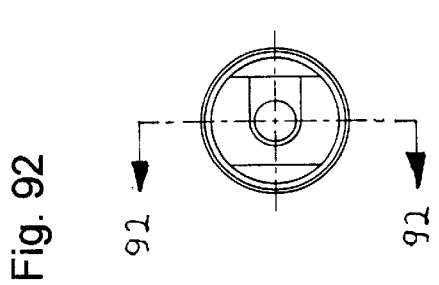
FIG. 92 is an end elevation from the front end of the control plunger shown in FIG. 90.
Figure 94:
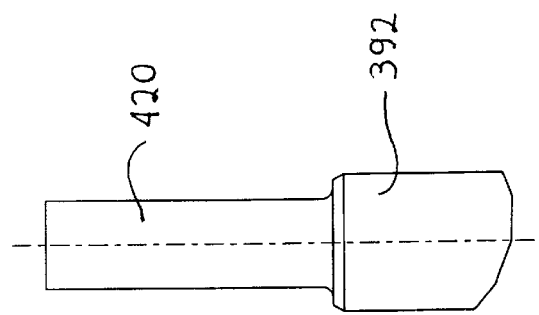
FIG. 94 is a plan view of the front end of the control piston.

The radial extension of the eight control pistons 205 in their channels 198 is controlled by eight cam wedges 260, shown in FIGS. 5, 6 and 32, and shown in detail in FIGS. 59–61. The cam wedges 260 each have an inner radial surface 261 having a beveled cam surface 262 lying at about 10° from an outer flat surface 264 that engages a floor 266 of an axially elongated slot 268 opening in the axial inner end face 270 of the front housing 162, as seen in FIGS. 27, 29 and 31. The cam wedges 260 each have a notch 272 opening in the inner surface 261 adjacent their front end 274. The notches 272 in the cam wedges 260 are engaged by an end of spring fingers 278, shown in FIGS. 6 and 32, projecting radially from a finger spring ring 280, shown in detail in FIGS. 6 and 62–64. Axial movement of the spring finger ring 280 toward the output end causes the spring fingers 278 to exert an axial force on the cam wedges 260, moving them axially into the tapering slots 209 in the control pistons and camming the control pistons 205 radially inward against the cam ring 130 to deform it toward a circular outer profile and an elliptical inner profile. The control pistons 205 will not readily move while they are loaded radially, and two opposing zones, corresponding to the pump pistons 195 that are being driven radially inward on the pumping stroke by the cam ring, are indeed radially loaded as the pump rotor 177 turns. However, two zones orthogonal to the pumping zones, corresponding to the pistons that are being recharged with fluid on the "suction" stroke", are unloaded. The control pistons 205 that are radially aligned with the unloaded pump pistons 200 are themselves unloaded and can readily be pushed radially inward by the cam wedges 260 pushed by the spring fingers 278 into the tapering slots 209 of the control pistons. In this way, axial movement of the spring finger ring 280 causes the cam wedges to move axially by incremental steps until the spring fingers 278 are at their relaxed position in the plane of the spring finger ring 280, shown in FIG. 64.

Figure 28:
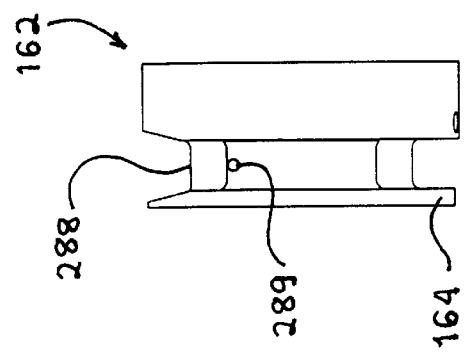
FIG. 28 is a side elevation of the front housing shown in FIGS. 26 and 27.
Figure 26:
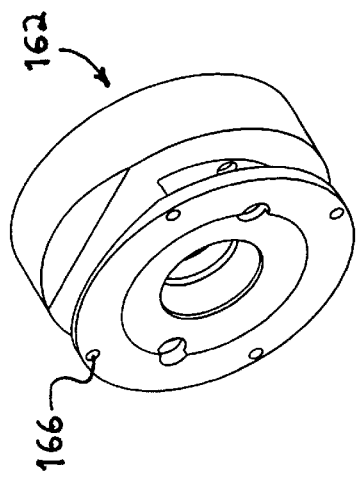
FIG. 26 is a perspective view of the front housing shown in FIG. 6, viewed from the attachment flange side.
Figure 30:
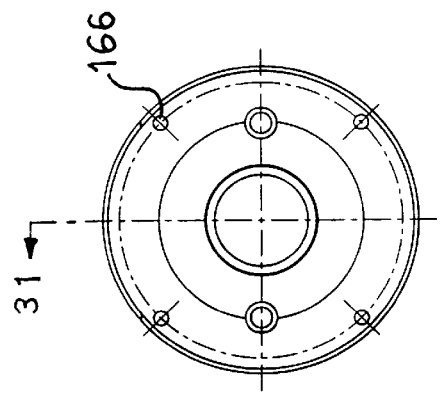
FIG. 30 is an end elevation of the front housing shown in FIG. 26 from the attachment flange side.

The position of the spring finger ring 280 is controlled by a yoke 285, shown in FIGS. 2–6 and 34, which is pivotally connected to the front housing 162 by a pivot pin 286 through holes 287 in the yoke 285 and a lateral hole 289 in the front housing 162, shown in FIGS. 28 and 31. The yoke 285 straddles a neck 288 at the front end of the front housing behind the mounting flange 164 and pivots about the pin 286. The ends of the two arms of the yoke 285 have slots 290 that receive the ends 292, ground flat, of two studs 294. The studs 294 are secured in the slots 290 in the ends of the yoke arms by roll pins 295 pressed into holes 297 in the ends of the studs 294 and extending through elongated lateral holes 296 in the ends of the yoke arms, intersecting the slots 290. The finger spring ring 280 is secured to the inner axial end face of the studs 294 by fasteners 298 extending through holes 299 in the finger spring ring 280 and threaded into axial holes in the ends of the studs 294.

As shown in FIGS. 3, 6, 25 and 34, the outer end of the yoke 285 is slotted and engages a pin 301 having a central internally treaded hole 305 into which a threaded shank 300 is screwed. A control cable 302 in a sheath 303 is secured to the end of the threaded shank 300 for tilting the yoke 285 about the pivot pin 286 and therefore controlling the shape of the cam ring 130 through the spring finger ring 280, the cam wedges 260 and the control pistons 205 as described above. As explained in further detail below, the pressure compensation assembly 160, shown in FIGS. 2, 3, 24, 25 and 34 compensates and adjusts the transmission 50 for an increase in the transmission ratio when the resistance torque on the output shaft increases to slow the output speed below that which the control cable is set to produce.

Figure 15:
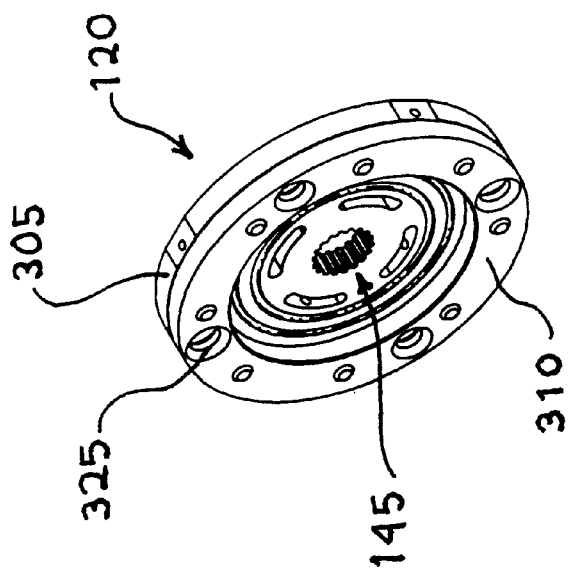
FIG. 15 is a perspective view of the commutator assembly shown in FIG. 3.
Figure 16:
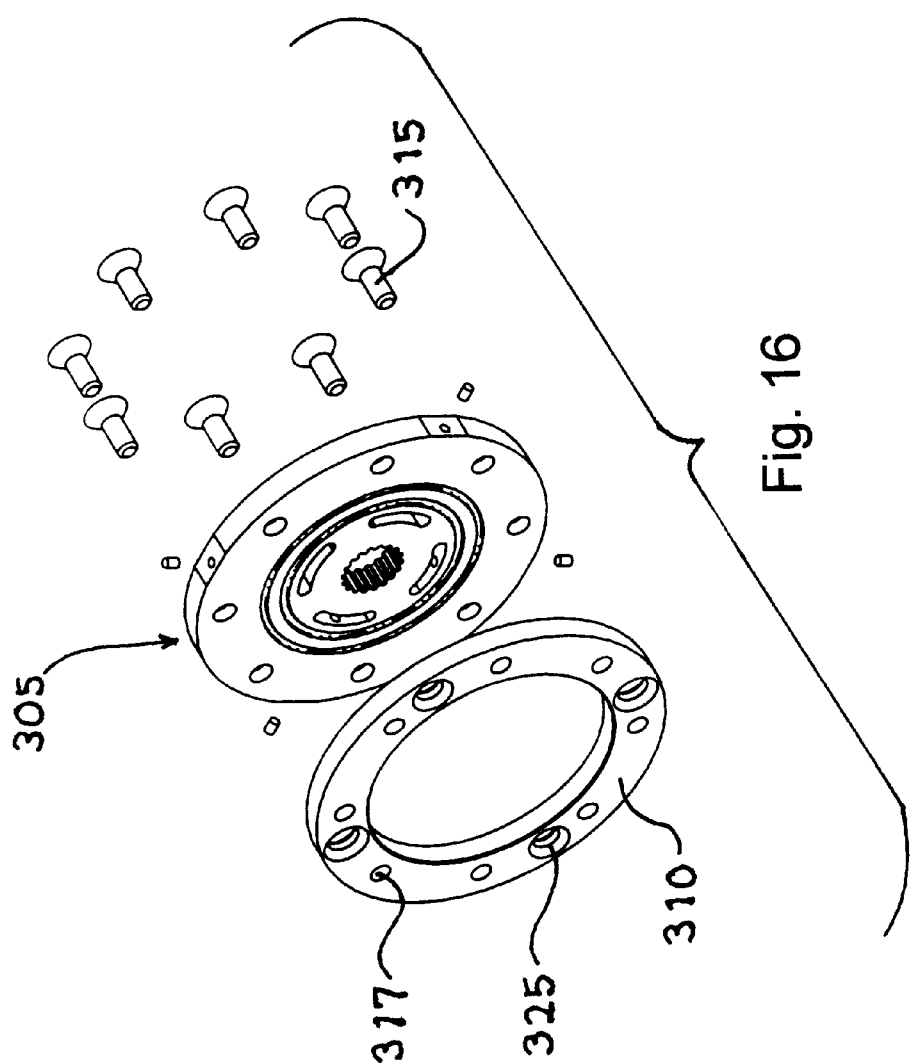
FIG. 16 is an exploded perspective view of the commutator assembly shown in FIG. 15.
Figure 23:
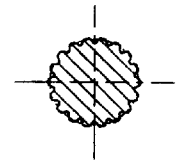
FIG. 23 is a sectional end elevation along lines 23—23 in FIG. 21.
Figure 22:
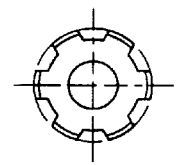
FIG. 22 is a end elevation along lines 22—22 in FIG. 21.
Figure 21:
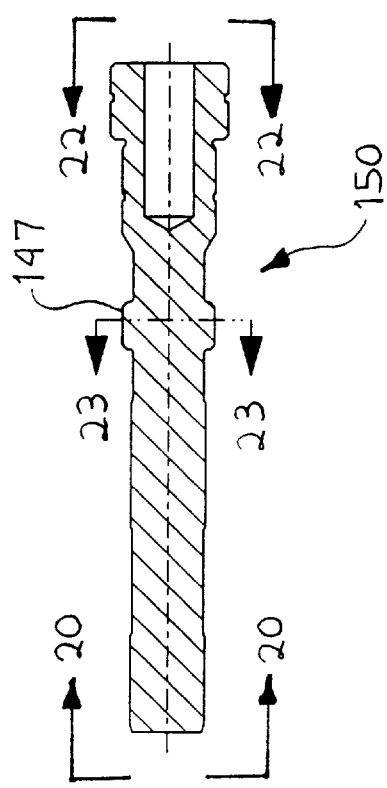
FIG. 21 is a sectional side elevation of the output shaft shown in FIG. 19 along lines 21—21 in FIG. 20.
Figure 20:
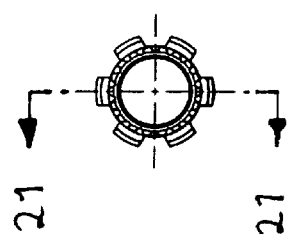
FIG. 20 is an end elevation of the output shaft along lines 20—20 in FIG. 21.
Figure 19:
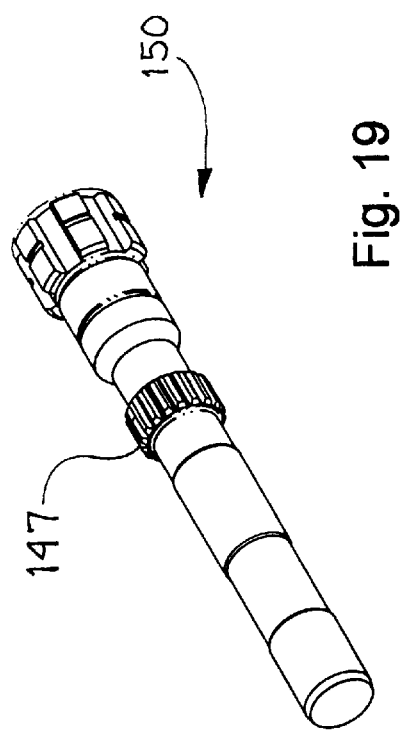
FIG. 19 is a perspective view of the output shaft shown in FIG. 3.

The commutator assembly 120 shown in FIGS. 3, 15 and 16 includes a commutator plate 305, shown in detail in FIGS. 65–69, and attached thereto, a connector ring 310, shown in detail in FIGS. 70–73. The commutator plate 305 has two opposed kidney-shaped slots 312, and two other opposed kidney-shaped slots 313 orthogonally disposed with respect to the slots 312. As shown in FIGS. 33 and 34, the four slots 312 and 313 extend axially through the commutator plate 305 at a radial distance from the axis 175 of the machine equal to the radial distance of the bottom of the channels 193 of the pump rotor 177 and eight through slots 314 in the end plate 190, shown in FIG. 8, that are axially aligned with the pump rotor channels 193. Two opposite kidney shaped slots 312 in the commutator plate 305 are axially aligned with rising or upward sloping surfaces on opposed lobes of the cam ring 130 as seen by the pump pistons 195, and the two orthogonally disposed kidney-shaped slots 312 are axially aligned with declining or downward sloping surfaces of the can ring 130 as seen by the pump pistons 195. Since the commutator plate turns with the cam ring 130, the lobes of the cam ring 130 remain at a constant angular position with respect to the slots 312 and 313 of the commutator plate 305, the slots 312 are always at high pressure, or "system" pressure, and the slots 313 are always at suction pressure at which the stator power pistons 200 are displacing fluid back into the pump channels 193 after the pressure cycle of the pump pistons 195.

The connector ring 310 is fastened to the commutator plate 305 with eight fasteners 315, as shown in FIG. 16, which extend through countersunk holes 317 in the commutator plate 305 and are threaded into eight threaded holes 320 in the connector ring 310. Four holes 325 in the connector plate 310 receive the four tabs 236 on the cam ring 130 by which the commutator assembly 120 is driven by the cam ring 130. The tabs 236 are positioned at nodes on the cam ring 130 which experience the least radial change when the cam ring 130 is flexed to change its shape, and the holes 325 are sized to accommodate any small dimensional change that might occur.

Figure 95:
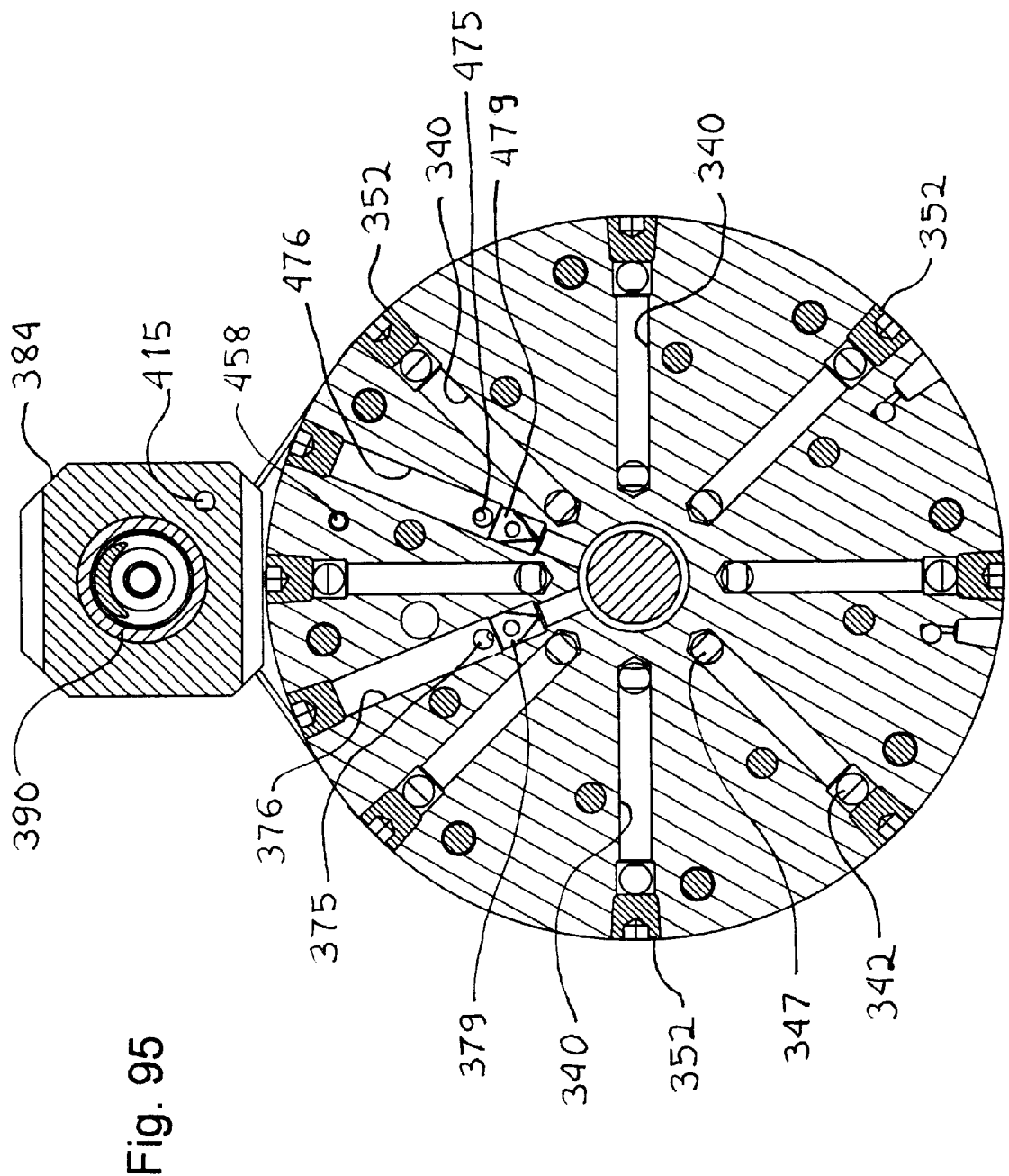
FIG. 95 is a sectional elevation through the rear housing along lines 95—95 in FIG. 34.
Figure 96:
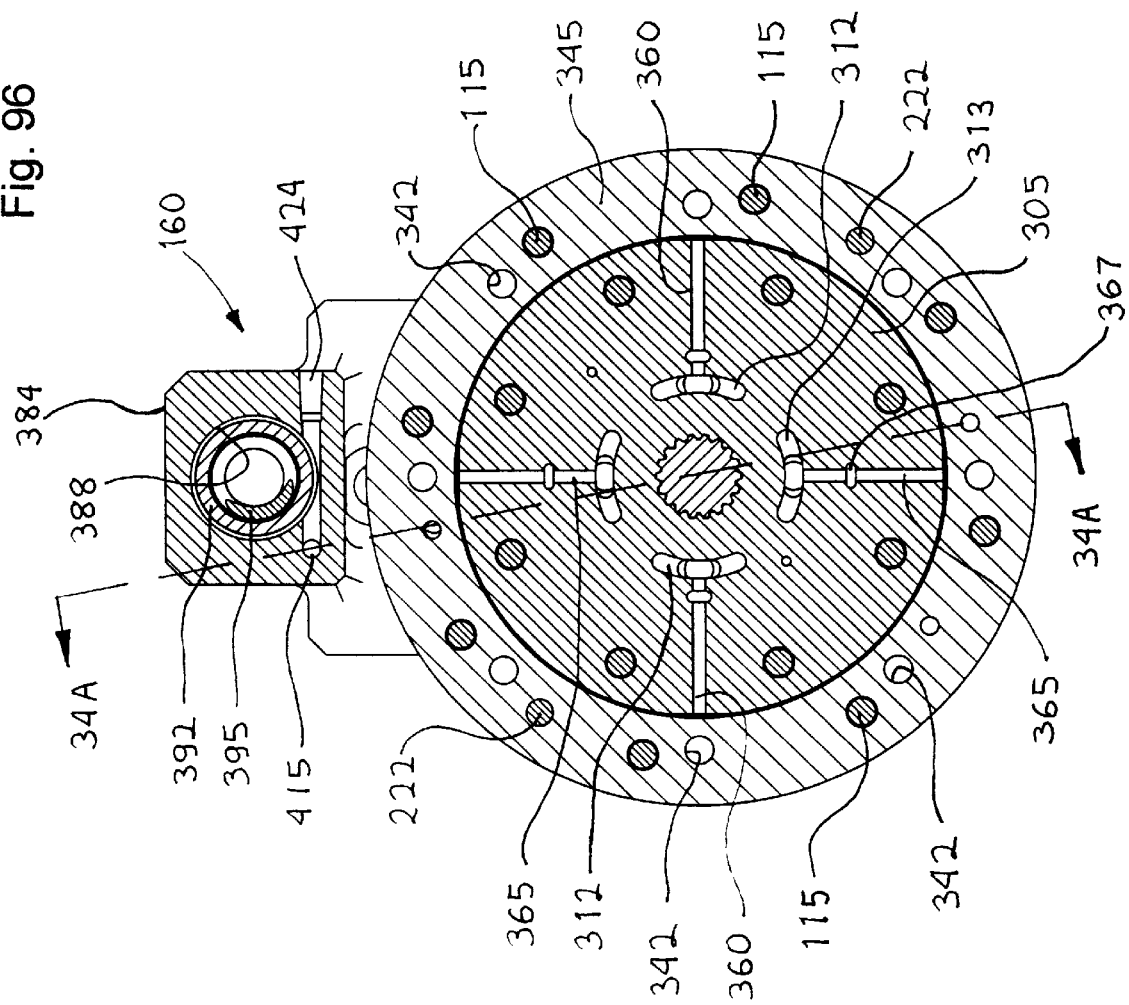
FIG. 96 is a sectional elevation along lines 96—96 in FIG. 34.

Fluid pressurized and displaced in the pump 191 flows out of the pump channels 193 and through the slots 314 in the end plate 190 to the system pressure slots 312 in the commutator plate 305. From there, it is distributed in a rotating pressure field through slots 330 in the thrust plate 113 shown in FIGS. 13 and 14, and shown in detail in FIGS. 74–80, to eight drilled passages 340 in the rear housing 112, as shown in FIG. 95. There is a set of drilled passages for each of the eight power piston channels 198 in the stator 174. The passages are provided by the drilled radial holes 340 that intersect axial holes 342 in an axial flange 345 in the rear housing 112 and are plugged at their radial outer ends with tapered plugs 352 to seal the radial holes 340 against leakage. The radial holes 340 intersect short axial holes 347 adjacent the axial bore 350 for the output shaft which are aligned with the slots 330 in the thrust plate 113. In this way, a closed circuit for transfer of fluid under pressure from the pump 191 to pressurize the stator power piston channels 198, and then for return flow of spent fluid from the stator power piston channels 198 as displaced by the cam ring lobe to refill the pump channels 193 on a "suction" stroke of the pump pistons 195.

As shown in FIGS. 33, 34, 66–68 and 96, the commutator plate 305 has two pairs of radial holes 360 and 365 which communicate with the pressure slots 312 and the suction slots 313, respectively. Each of the radial holes 360 and 365 is plugged at its outer end after it is drilled. Two axial holes 367 are drilled communicating between the radial holes 360 and an inner circular groove 370 in the rear or output face 372 of the commutator plate 305. The inner groove 370 is spaced radially from the axis 175 of the commutator plate 305 a distance equal to the radial distance of a pressure hole 374 in the thrust plate 113, seen in FIGS. 32 and 76, which communicates therethrough to and through an axial hole 375 in the rear housing 112 to a radial hole 376 in the back wall of the rear housing 112, as shown in FIGS. 87 and 95. An axial hole 377 in the rear housing communicates between the radial hole 376 and a counterbored hole 378 in a pressure compensator body 384 of the pressure compensation assembly 160, as shown in FIGS. 32 and 88–90, to provide a constant source of fluid under system pressure for the pressure compensation assembly 160.

An outer groove 470 concentric with the inner groove 370 and spaced radially outward therefrom in the rear or output face 372 of the commutator plate 305 is in communication with the radial holes 365 through two axial holes 467. The outer groove 470 is spaced radially from the axis 175 of the commutator plate 305 a distance equal to the radial distance of a suction hole 474 in the thrust plate 113, seen in FIGS. 32 and 76, which communicates therethrough to and through an axial hole 475 in the rear housing 112 to a radial hole 476 in the back wall of the rear housing 112, as shown in FIG. 95. An axial hole 477 in the rear housing communicates between the radial hole 476 and a counterbored hole 478 in the pressure compensator body 384 of the pressure compensation assembly 160, as shown in FIGS. 32 and 88–90, to provide suction channel for the pressure compensation assembly 160.

As shown in FIG. 85, the radial inner ends of the radial holes 376 and 476 have check valves 379 and 479, respectively, which check against high pressure flow into the fluid sump within the housing but allow flow from the sump to the low pressure side for make-up fluid, from hole 376 or from hole 476 when the holes 376 and 475 flip-flop from high/low pressure to low/high pressure during back driving, etc.

The pressure compensation assembly 160, shown in FIGS. 3, 24, 25, 34, and 88–98, has a control plunger 380 that slides in an axial cylinder 382 opening in the front end of the pressure compensation body 384, shown in FIGS. 88 and 89. The pressure compensation body 384 is fastened through holes 385 to the back face of the rear housing 112 with two of the fasteners 115 that secure the rear housing assembly 110 and center assembly 90 to the control assembly 80, plus one additional fastener 386 through a hole 387. As shown in FIGS. 34 and 89, the cylinder 382 has a stepped bore that is slightly larger in internal diameter at its middle portion 388 compared to a inner portion 389, and the plunger 380, shown in detail in FIGS. 90–93, is also stepped, with a larger diameter at its inner end 390 compared to its middle portion 392. A compression coil spring 395 lies in an internal bore 397, opening in the inner end of the plunger 380, and bears against the inner end 396 of the cylinder 382.

As shown in FIGS. 34, 88 and 89, the outer end of the cylinder 382 is enlarged in diameter at 399 to receive a control cap 400 which is secured in place in the enlarged bore 399 with a snap ring 402 in an inwardly opening circumferential groove 403. The control cap has an outer circumferential groove that receives an "O" ring 404 by which the control cap is sealed in the bore 399, and an inner circumferential groove that receives an "O" ring 406 which seals the interface between the plunger 380 and the control cap 400 against loss of fluid. A control stop ring 410 is trapped between the inner end of the control cap and a shoulder formed at the junction of the outer enlarged diameter end 399 and the middle portion 388 of the cylinder 382. The control stop ring 410 has an inner diameter that receives the middle portion 392 of the plunger 380 with a close sliding fit but will not pass the larger diameter inner end 390 of the plunger 380, so the control stop ring 410 engages the shoulder at the junction of the inner end 390 and the middle portion 392 of the plunger 380 and prevents the plunger 380 from moving farther out of the cylinder 382 than the position shown in FIG. 34. An inwardly opening circumferential groove 413 receives a sealing ring to seal the interface between the enlarged diameter inner end portion 390 of the plunger 380 in the bore 389 as shown in FIG. 34.

The hole 378 in the pressure compensation body 384, shown in FIG. 88, communicates with a vertical hole 412 drilled in the pressure compensation body 384 and communicating with a horizontal hole 414, plugged at its opening in the side of the pressure compensation body 384. Another vertical hole 416, plugged at its opening in the bottom face of the pressure compensation body 384, intersects the passage 478, which is normally at suction pressure but can flip-flop in pressure with the passage 378 during back driving, etc. A pair of check valves 417 and 419 picks off the high pressure from either passage 378 or 478, whichever is at high pressure, and conveys the high pressure fluid to a hole 421 opening in the back face of the pressure compensation body 384, as seen in FIG. 34A. A vertical hole 423 connects the holes 421 (shown in phantom because it is not actually seen in FIG. 98) with a longitudinal hole 415 extending forward parallel to the bore 382 to a cross hole 424, plugged at its opening in the side of the pressure compensation body 384 and communicating with the middle portion 388 of the cylinder 382 so that the annular space between the middle portion 388 of the cylinder 382 and the middle portion 392 of the plunger 380 is pressurized with system fluid pressure through the opening 415. If the system fluid pressure rises high enough, such as when the load on the output shaft increases, as occurs when the vehicle ascends a steep hill, the force exerted on the plunger 380 by the system fluid pressure drives the plunger deeper into the cylinder 382 when the fluid pressure force exceeds the spring force of the compression spring 395. The plunger 380 moves into the cylinder 382 and the pin 301, shown in FIGS. 24, 25 and 34, slides in a slot 418 in the outer end 420 of the plunger 380 until the outer end of the slot 418 reaches the pin 301, whereupon the outer end of the plunger 380 initially compresses a spring 422 contained in a spring canister 425 and in contact with the outer end of the plunger 380. The spring canister 425 provides a buffer between the forces acting on the control cable 302 or the threaded shank 300 to absorb cable movement and prevent sudden extreme movement of the studs 294 which could distorting the finger spring ring 280 before the cam wedges 260 can move to the right in the control pistons 205 in FIG. 32. The compressed spring 422 exerts a constant force on the cable sheath 303 to pull the cable 302 to the set position as the control wedges 260 work themselves into the set position axially in the control pistons 205.

The action of the pressure compensation assembly 160 is to rotate the yoke 285 clockwise about its pivot pin 286 in FIG. 34 when the system pressure rises because of an increase in the resistance torque on the output shaft 150. The transmission ratio is adjusted to shift the transmission to a lower gear when the control assembly operates, to increase the torque on the output shaft to react the increased back torque by the load on the output shaft 150.

Figure 97:
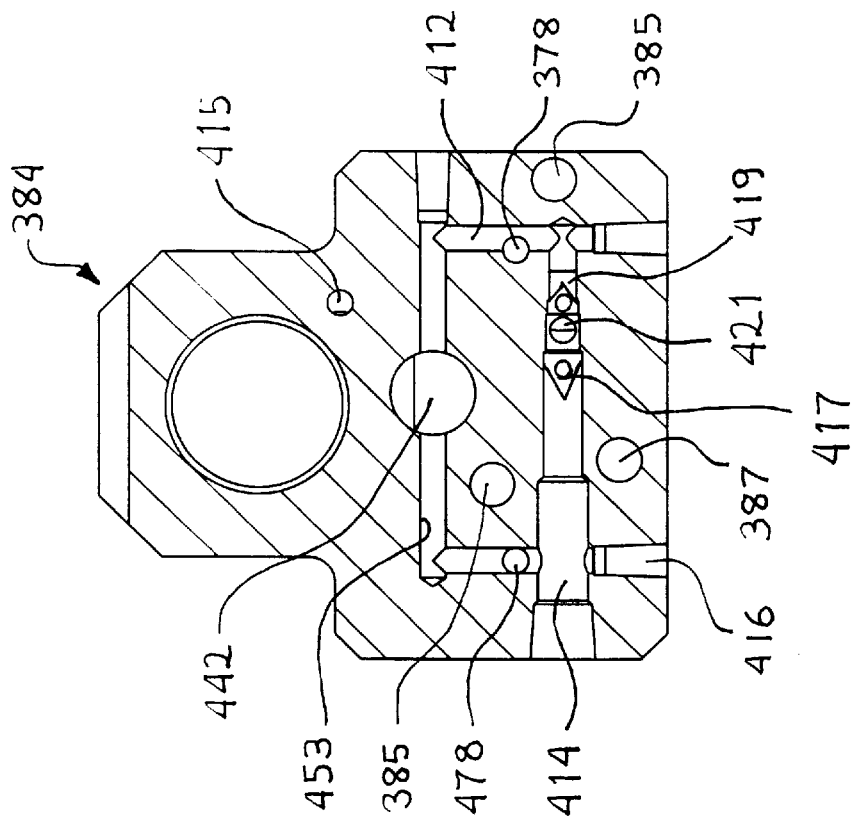
FIGS. 97 and 98 are sectional elevations along lines 97—97 and 98—98, respectively, of the pressure compensator body shown in FIG. 89.
Figure 98:
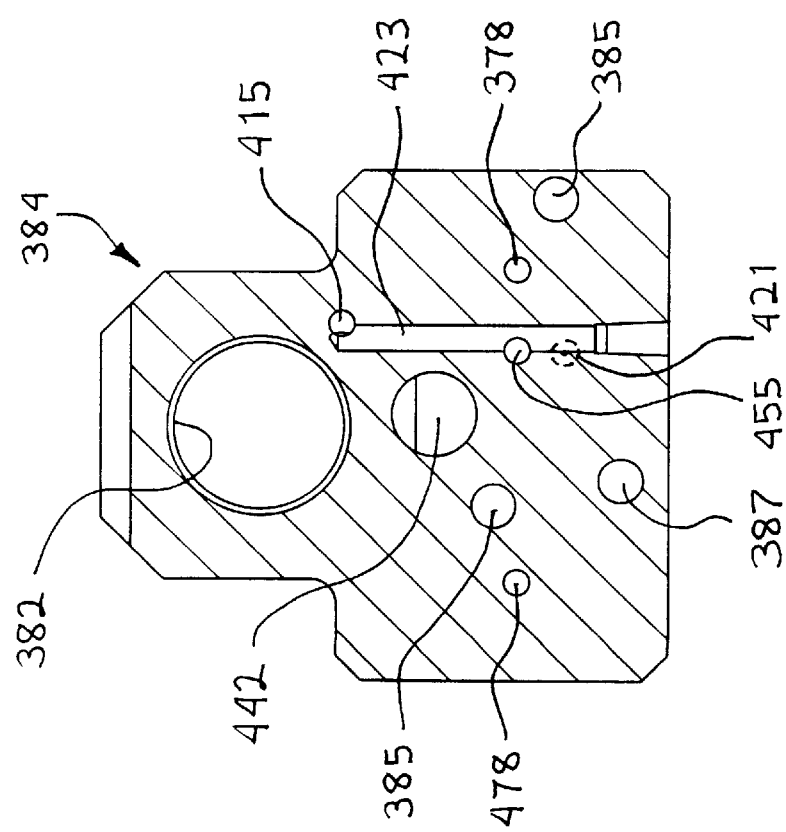

A pressure dump valve 440 is mounted in a bore 442 in the pressure compensator body 384 lying parallel to the cylinder 382. The valve 440 has a cylindrical valve spool 445 having a cross hole 448 drilled laterally therethrough. The valve spool 445 is held in the bore 442 with a fastener 450 that extends through a washer 451 that is larger than the bore 442. A semi-cylindrical recess 452 in the back face of the rear housing 112 receives the washer 451 so the pressure compensator housing 384 can lie flat against the back face of the rear housing 112. A cross hole 453, shown in FIGS. 89, 90, and 97, is drilled laterally through the pressure compensator body 384 intersecting the axis of the bore 442 at the axial position of the hole 448 in the valve spool 445, and communicating between the vertical holes 412 and 416. When the valve spool 445 is turned 90° from the position shown in FIGS. 25 and 34, the cross hole 448 communicates through the valve spool 445 between the two openings of the cross hole 453 in the bore 442 and short circuits the pressure line 378 (or 478 if the pressure happens to be flip-flopped at the time) to sump. The effect is to vent the fluid pressure and reduce the torque exerted by the transmission 50 to zero, much like stepping on the clutch in a conventional transmission.

The continuously variable hydrostatic transmission 50 converts input power in the form of torque in the input shaft 100 rotating at a certain speed to output power in the output shaft in the form of a different torque in the output shaft rotating at a different speed. The pump rotor 177 is driven by the input shaft 100, rotating the pump pistons 195 around the cam ring 130. The lobes of the cam ring where the cam ring is thickened by the lunettes 234 drive the pump pistons 195 into their channels 193, pressurizing and displacing fluid in and from the channels 193. The resolution of the radial forces exerted by the rotating pump pistons 195 on the cam ring 130 produces a balanced force couple on the cam ring 130 that is transmitted through the tabs 236 on the cam ring 130 to the connector ring 310 on the commutator assembly 120 and thence through the splined bore 145 to the output shaft.

The pressurized fluid flows through the slots 314 in the end plate 190 and is collected by the kidney-shaped pressure slots 312 in the commutator plate 305, and distributed as a rotating pressure field to the individual drilled passages 347-340-342 to the stator channels 198 where it pressurizes the channels in synchronism with the rotating cam ring 130 to drive the stator power pistons 200 against the "down-hill" slope of the cam lobes to produce another force couple on the cam ring 130, producing additional torque in the cam ring that is transmitted therethrough to the output shaft by the same path described above.

Initially, the volumetric flow rate is very low because the displacement of the pump is small. At the intermediate position of the cam ring, in which the displacements of the pump 191 and stator 192 are about equal, the fluid flow rate is maximum. As the cam ring is distorted more toward a circular profile of the outer sleeve 232 and the transmission ratio approaches 1:1, the displacement of the stator 192 decreases and the speed of the cam ring 130 approaches the input speed of the input shaft 100, as the volumetric fluid flow rate again becomes small. The low fluid flow losses of this transmission 50 thus contributes to its high operating efficiency.

Obviously, numerous modifications and variations of the disclosed embodiment of this invention are possible and will occur to those skilled in the art in view of this disclosure. Accordingly, it is expressly intended that these modifications and variations, and the equivalents thereof, be within the spirit and scope of the invention as defined in the appended claims, wherein we claim:

What is claimed is:

1. An infinitely variable hydrostatic transmission, comprising:
    a radial piston pump having outwardly opening cylinders containing radial pump pistons for displacing fluid under pressure when said pump pistons are driven radially into said pump cylinders, and a radial piston motor having inwardly opening cylinders having radial motor pistons for moving forcefully outwardly in said motor cylinders under influence of fluid pressurized in said pump, said pump arranged concentrically within said motor;
    fluid passages intermittently connecting said pump cylinders and said motor cylinders in a closed fluid flow circuit;
    a flexible cam ring radially interposed between said pump and said motor and in radial load bearing relation to said pump pistons on an inside surface of said cam ring, and in radial load bearing relation to said motor pistons on an outside surface of said cam ring, said cam ring having at least one lobe having sloping surfaces for 1) driving said pump pistons into said pump cylinders as said pump rotates around said cam ring to pressurize and displace fluid from said pump cylinders, and for 2) being driven rotationally by said radial motor pistons in said inwardly opening cylinders of said motor pressurized by fluid pressurized and displaced by said pump;
    an input shaft coupled in torque driving relation to said pump;
    an output shaft rotationally coupled in torque driven relation to said cam ring; and
    an adjustment mechanism for adjusting said cam ring to a desired radial profile to set said transmission to a desired transmission ratio.

2. An infinitely variable hydrostatic transmission as defined in claim 1, further comprising:
    a fluid distribution system, including said fluid passages, for establishing fluid communication for fluid flow from said pump cylinders to said motor cylinders during a pressure phase of the stroke of said pump pistons, and for establishing fluid communication for fluid flow from said motor cylinders to said pump cylinders during a suction phase of the stroke of said pump pistons.

3. An infinitely variable hydrostatic transmission as defined in claim 2, further comprising:
    a housing containing said pump and said motor, and a commutator plate disposed axially between said pump and an end of said housing; and
    said fluid passages including kidney-shaped slots in said commutator plate and cylinders and drilled fluid passages in said end of said housing, said slots communicating between said pump cylinders and said drilled fluid passages in said end of said housing;
    said commutator plate torsionally coupled to said output shaft and rotating therewith at the same rotational speed as said output shaft.

4. An infinitely variable hydrostatic transmission as defined in claim 3, further comprising:
    a thrust piston disposed between said pump and an end of said housing opposite to said one side of said housing and movable in a cylinder pressurized by said system pressure to react and balance pressure forces exerted by said system pressure on said pump from said one side of said housing.

5. An infinitely variable hydrostatic transmission as defined in claim 2, wherein:
    said commutator plate channels include a pair of opposed kidney-shaped slots for each lobe of said cam ring, said kidney-shaped slots dimensioned to convey pressurized fluid displaced from said pump cylinders to said motor cylinders during substantially the entire portion of said pressure phase of said piston stroke, in which said pump pistons face a rising section of said cam ring, and also dimensioned to convey spent fluid at suction pressure displaced from said motor cylinders during substantially the entire portion of said suction phase of said pump piston stroke in which said motor pistons face a rising section of said cam ring;
    whereby the angular position of said commutator, controlled by the angular position of said output shaft, aligns said commutator plate slots with said rising and declining faces of said cam ring to ensure that said slots carry pressure and suction fluid during substantially the entire pressure and suction phases of said piston strokes, and that said slots do not establish a short circuit fluid flow between pressure and suction channels of said fluid passages.

6. An infinitely variable hydrostatic transmission as defined in claim 5, wherein:
    said radial piston motor includes a motor stator fixed to said housing and containing said inwardly opening motor cylinders.

7. An infinitely variable hydrostatic transmission as defined in claim 6, wherein:
    said pump pistons are rectangular in circumferential cross section.

8. An infinitely variable hydrostatic transmission as defined in claim 6, wherein:

said fluid flow channels include drilled radial and axial passages in said housing.

9. An infinitely variable hydrostatic transmission as defined in claim 6, further comprising:

a pair of needle bearing sets for transmitting radial forces between said cam ring and said pump and motor pistons while minimizing angular drag forces therebetween.

10. An infinitely variable hydrostatic transmission as defined in claim 6, wherein said adjustment mechanism comprises:

radial control pistons in said motor stator and movable radially to deform said cam ring to a desired profile.

11. An infinitely variable hydrostatic transmission as defined in claim 10, wherein said adjustment mechanism comprises:

cam wedges movable axially into said motor stator and interacting with wedge-shaped surfaces on said radial control pistons to push said radial control pistons radially against said cam ring.

12. An infinitely variable hydrostatic transmission as defined in claim 11, wherein said adjustment mechanism comprises:

studs movable axially in said housing under control of a control cable for adjusting said transmission ratio; and a spring ring having spring fingers engaged with said cam wedges for exerting a spring force on said cam wedges to bias said cam wedges to desired positions in said motor stator.

13. An infinitely variable hydrostatic transmission as defined in claim 10, further comprising:

a pressure compensator having a control plunger movable in a cylinder under influence of fluid pressure;

control fluid passages extending from a source of system pressure for automatically adjusting said radial control pistons to increase said transmission ratio when said output shaft experiences an increase in resistance torque above a predetermined value.

14. A method of converting input rotary power in an input shaft at an input speed and torque to output rotary power in an output shaft at an output speed and torque that is adjustable relative to said input speed and torque and within 90% of said input power, comprising:

rotating a radial piston pump rotor with said input shaft at said input speed and carrying radial pump pistons in radial pump channels around a flexible cam ring having an adjustable profile;

driving said radial pump pistons radially in said channels by operative interaction with said flexible cam ring and displacing fluid under pressure from said radial pump channels by said radial pump pistons while exerting a first torque component on said cam ring with said pump pistons;

conveying said pressurized fluid displaced from said radial pump channels to radial stator channels in a radial piston motor stator disposed concentrically with respect to said cam ring and said radial piston pump to drive radial motor pistons in said radial stator channels radially into operative interaction with said cam ring to exert a second torque component on said cam ring, said second torque component being in the same direction as said first torque component;

transmitting torque from said cam ring to said output shaft; and adjusting said cam ring to change said profile and thereby change said pump and motor displacements.

15. A method as defined in claim 14, further comprising:

sensing an increase of system fluid pressure when resistance torque on said output shaft exceeds a predetermined magnitude and using said system fluid pressure to shift said transmission to a lower transmission ratio to increase torque to said output shaft.

16. A method as defined in claim 14, wherein:

said cam ring adjusting step includes extending radial control pistons in said motor stator into forcible operative engagement with said cam ring to exert radial forces thereon sufficient to flex said cam ring to a desired profile.

17. A method of transmitting torque from a prime mover to driven wheels of a vehicle, comprising:

driving an input shaft of a continuously variable hydrostatic transmission with an output shaft of said prime mover;

rotating a radial piston pump rotor with said input shaft at said input speed and carrying radial pump pistons in radial pump channels around a flexible cam ring having a profile;

driving said radial pump pistons radially in said channels by operative interaction with said flexible cam ring and displacing fluid under pressure from said radial pump channels by said radial pump pistons while exerting a first torque component on said cam ring;

conveying said pressurized fluid displaced from said radial pump channels to radial stator channels of a radial piston motor disposed concentrically with respect to said cam ring and said radial piston pump to drive radial motor pistons in said radial stator channels on a power stroke radially into operative interaction with said cam ring to exert a second torque component on said cam ring, said second torque component being in the same direction as said first torque component;

transmitting torque from said cam ring to said output shaft; and adjusting said cam ring to change said profile and thereby change said pump and motor displacements.

18. A method as defined in claim 17, wherein:

said torque transmitting step includes driving a commutator plate with said cam ring and driving said output shaft with said commutator plate.

19. A method as defined in claim 18, further comprising:

conveying spent fluid displaced from said radial stator channels of said radial piston motor in a suction stroke after said power stroke to refill said radial pump channels of said pump in preparation for a subsequent power stroke; and said pressurized fluid conveying step and said spent fluid conveying step include aligning kidney-shaped passages in said commutator plate with passages aligned with said pump rotor containing pump pistons operatively engaged with an ascending face of said cam ring, and passages aligned with said motor stator containing motor pistons operatively engaged with a descending face of said cam ring.

20. A method as defined in claim 17, further comprising:

sensing the pressure of said pressurized fluid as a function of resistance torque exerted by said vehicle on said output shaft and automatically shifting said transmission to a lower transmission ratio to increase torque delivered by said transmission to said output shaft.

* * * * *